(12) United States Patent
Wei et al.

(10) Patent No.: US 9,654,045 B2
(45) Date of Patent: May 16, 2017

(54) QUASI VECTOR MOTOR CONTROLLER

(71) Applicant: Rockwell Automation Technologies, Inc., Mayfield Heights, OH (US)

(72) Inventors: Kun Wei, Shanghai (CN); HaiHui Lu, Shanghai (CN); Andrew Jaap, Milwaukee, WI (US); David Messersmith, Kenosha, WI (US); Randall Langer, Oak Creek, WI (US); Ping Lee, Milwaukee, WI (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 356 days.

(21) Appl. No.: 14/321,356

(22) Filed: Jul. 1, 2014

(65) Prior Publication Data

US 2015/0333685 A1    Nov. 19, 2015

(51) Int. Cl.
*H02P 1/04* (2006.01)
*H02P 1/16* (2006.01)
*H02P 27/04* (2016.01)
*H02P 1/26* (2006.01)

(52) U.S. Cl.
CPC ............. *H02P 27/047* (2013.01); *H02P 1/04* (2013.01); *H02P 1/16* (2013.01); *H02P 1/26* (2013.01)

(58) Field of Classification Search
CPC .. H02P 1/26; H02P 27/047; H02P 1/04; H02P 1/16
USPC .................................. 318/778, 430
See application file for complete search history.

(56) References Cited

U.S. PATENT DOCUMENTS

| | | |
|---|---|---|
| 4,996,470 A | 2/1991 | Rowan et al. |
| 5,187,419 A | 2/1993 | DeLange |
| 7,023,166 B1 | 4/2006 | Kohen et al. |
| 7,345,449 B2 | 3/2008 | Barie et al. |
| 8,040,086 B2 | 10/2011 | Yamamoto |
| 8,138,709 B2 | 3/2012 | Messersmith et al. |
| 8,179,082 B2 | 5/2012 | Li et al. |
| 8,203,304 B2 | 6/2012 | Lu et al. |

(Continued)

FOREIGN PATENT DOCUMENTS

| | | |
|---|---|---|
| CN | 1599230 | 3/2005 |
| CN | 1808881 | 7/2006 |
| CN | 1889354 A | 1/2007 |

(Continued)

*Primary Examiner* — Bentsu Ro
*Assistant Examiner* — Zemenay Truneh
(74) *Attorney, Agent, or Firm* — Kunzler Law Group

(57) ABSTRACT

An apparatus includes a switch module that selectively turns on a switch to connect an input power conductor connected to a voltage source to a motor in a sequence. The switch for each phase is turned on for a portion of a cycle of a fundamental frequency of the voltage source. A source phase module determines a phase of the AC voltage source, a back-EMF phase module determines a phase of a back-EMF of the motor, and a torque module determines when a phase difference between the phase of the AC voltage source and the phase of the back-EMF is within a phase range indicative of a positive motor torque. A pulse module enables the switches in response to the phase difference having a phase within the phase range and disables the switches in response to the phase difference having a phase not in the phase range.

20 Claims, 12 Drawing Sheets

(56) References Cited

U.S. PATENT DOCUMENTS

2015/0180377 A1\* 6/2015 Hua .................. H02P 1/04
                                                                                                 318/778

FOREIGN PATENT DOCUMENTS

| CN | 201550058 U | 8/2010 |
|---|---|---|
| CN | 202009354 U | 10/2011 |
| CN | 202172377 U | 3/2012 |
| CN | 103199768 A | 7/2013 |
| EP | 0408045 A1 | 1/1991 |
| EP | 2061144 A1 | 5/2009 |

\* cited by examiner

US 9,654,045 B2

QUASI VECTOR MOTOR CONTROLLER

CROSS-REFERENCE TO RELATED APPLICATIONS

This application claims priority to Chinese Patent Application Number 20141021196.9 entitled "QUASI VECTOR MOTOR CONTROLLER" and filed on May 19, 2014 for Kun Wei, et al. the entire contents of which are incorporated herein by reference for all purposes. See MPEP §201.14.

FIELD

The subject matter disclosed herein relates to motor control and more particularly relates to motor control during startup using a quasi vector motor controller.

BACKGROUND INFORMATION

Alternating current ("AC") motors often have a high startup current, especially certain design types such as National Electrical Manufacturers Association ("NEMA") design B motors, which are popular. In addition, motors controlled by switches that connect a voltage source to a motor may also include controllers that have undesirable characteristics, such as high current, negative torque pulses, noise, etc. Often motor starters are used that include a mechanism to start motors while keeping starting current low. Other controllers may also control speed between zero and full speed of the motor. A wide variety of motor starters and controllers are available, including traditional motor starters that use a reduced voltage to start motors. However, many motor starters are inefficient. Variable frequency drives ("VFDs") may also be used to start or control a motor. While variable frequency drives are common, thyristor-based starters have certain advantages as well. For example, thyristor-based starters may be more economical for larger motors and may be smaller than VFDs. VFDs may be used for motor speed control, but certain applications may not need variable speed after startup and therefore a lower cost starter may be desirable. Thyristors are often sized to handle a certain amount of current, so reduction of current during startup is desirable. A control method for motor startup and control that minimizes negative torque pulses is desirable.

BRIEF DESCRIPTION

An apparatus for a quasi vector motor controller is disclosed. A system and method also perform the functions of the apparatus. The apparatus includes a switch module that, for each phase, selectively turns on a switch to connect an input power conductor connected to an alternating current ("AC") voltage source to a motor in a sequence. The switch for each phase is turned on for a portion of a cycle of a fundamental frequency of the AC voltage source, where the portion is less than a full cycle of the fundamental frequency. The apparatus includes, in one embodiment, a source phase module that determines a phase of the AC voltage source, a back-EMF phase module that determines a phase of a back-electromotive force ("back-EMF") of the motor, and a torque module that determines when a phase difference between the phase of the AC voltage source and the phase of the back-EMF is within a phase range indicative of a positive motor torque. The apparatus includes, in one embodiment, a pulse module that enables turning on of the switch for each phase of the motor in response to the phase difference having a phase within the phase range and disables turning on of the switch for each phase of the motor in response to the phase difference having a phase not in the phase range.

In one embodiment, the phase range includes phases where motor torque is expected to be positive. In a further embodiment, the phase range includes phases between about zero degrees and about 30 degrees. In another embodiment, the source phase module determines a phase of the AC voltage source using the following equation:

$$\theta_{supply} = \tan^{-1}\left(\frac{V_\beta}{V_\alpha}\right)$$

where:
$\theta_{supply}$ is the phase of the voltage source; and
$V_\alpha$, $V_\beta$ are stator voltage in a stationary reference frame, where the voltage for each phase of the voltage source is transformed to the stationary reference frame using an alpha-beta transformation.

In another embodiment, the back-EMF phase module determines a phase of back-EMF of the motor using voltage and current measurements in a stator of the motor. In another embodiment, the back-EMF phase module determines a phase of back-EMF of the motor using the following equation:

$$\theta_{emf} = \tan^{-1}\left(\frac{\int (V_\beta - I_\beta R_s)dt}{\int (V_\alpha - I_\alpha R_s)dt}\right) + 90°$$

where:
$\theta_{emf}$ is the phase of the back-EMF of the motor; and
$R_s$ is resistance of stator winding;
$V_\alpha$, $V_\beta$ are stator voltage in a stationary reference frame; and
$I_\alpha$, $I_\beta$ are stator current in the stationary reference frame, where the voltage and current for each phase of the motor is transformed to the stationary reference frame using an alpha-beta transformation.

In another embodiment, the switch module includes one or more thyristors for each phase of the motor and each thyristor is controlled by adjusting a phase angle for turning on each thyristor.

In one embodiment, the apparatus includes a startup module that varies an on time of each switch to control motor startup. The on time for each switch includes a time when the switch is in a conductive state. In another embodiment, the startup module includes a DFC module that sequentially applies a series of discrete frequencies to the motor as part of a discrete frequency control ("DFC") method for motor starting. Each discrete frequency includes a frequency lower than the fundamental frequency of the AC voltage source providing power to the motor. In a further embodiment, the DFC module applies a discrete frequency by varying a phase angle for turning on a thyristor to generate positive current pulses of varying amplitudes for a positive half cycle of the discrete frequency and then varying a phase angle for turning on a thyristor to generate negative current pulses of varying amplitudes for a negative half cycle of the discrete frequency, wherein each current pulse is generated at a rate consistent with the fundamental frequency of the AC voltage source.

In another embodiment, the startup module further includes a step start module that applies one or more starting steps where each starting step includes maintaining on time of the switches at a fixed value for a predetermined period of time. In another embodiment, the startup module includes a ramp module that ramps on time of the switches using a ramp function. In another embodiment, the apparatus includes a contactor module that applies full input voltage to the motor after a last step of the startup module. The contactor module applies the full input voltage by closing a contactor in parallel with each switch.

A method for a quasi vector motor controller includes, for each phase of a motor, selectively turning on a switch to connect an input power conductor connected to an AC voltage source to the motor in a sequence. The switch for each phase is turned on for a portion of a cycle of a fundamental frequency of the AC voltage source and the portion includes less than a full cycle of the fundamental frequency. In one embodiment, the method includes determining a phase of the AC voltage source, determining a phase of a back-EMF of the motor, and determining when a phase difference between the phase of the AC voltage source and the phase of the back-EMF is within a phase range indicative of a positive motor torque. In one embodiment, the method includes enabling turning on of the switch for each phase of the motor in response to the phase difference including a phase within the phase range and disabling turning on of the switch for each phase of the motor in response to the phase difference including a phase not in the phase range.

In one embodiment, determining a phase of the AC voltage source includes using the following equation:

$$\theta_{supply} = \tan^{-1}\left(\frac{V_\beta}{V_\alpha}\right)$$

where:
$\theta_{supply}$ is the phase of the voltage source; and
$V_\alpha, V_\beta$ are stator voltage in a stationary reference frame, where the voltage for each phase of the voltage source is transformed to the stationary reference frame using an alpha-beta transformation.

In another embodiment, determining a phase of back-EMF of the motor includes using the following equation:

$$\theta_{emf} = \tan^{-1}\left(\frac{\int (V_\beta - I_\beta R_s)dt}{\int (V_\alpha - I_\alpha R_s)dt}\right) + 90°$$

where:
$\theta_{emf}$ is the phase of the back-EMF of the motor; and
$R_s$ is resistance of stator winding;
$V_\alpha, V_\beta$ are stator voltage in a stationary reference frame; and
$I_\alpha, I_\beta$ are stator current in the stationary reference frame, where the voltage and current for each phase of the motor is transformed to the stationary reference frame using an alpha-beta transformation.

In another embodiment, the method includes varying an on time of each switch to control motor startup where the on time for each switch includes a time when the switch is in a conductive state. In another embodiment, varying an on time of each switch to control motor startup includes sequentially applying a series of discrete frequencies to a motor as part of a DFC method for motor starting where each discrete frequency includes a frequency lower than a fundamental frequency of the AC voltage source providing power to the motor. In another embodiment, varying an on time of each switch to control motor startup includes applying one or more steps where each step includes maintaining on time of the switches at a fixed value for a predetermined period of time. In another embodiment, varying an on time of each switch to control motor startup includes ramping on time of the switches using a ramp function.

A system for a quasi vector motor controller includes a motor starter that has, for each phase of a motor, one or more switches connecting a phase of an AC voltage source to the motor, and a switch module that, for each phase, selectively turns on the one or more switches to connect an input power conductor connected to the AC voltage source to the motor in a sequence. The one or more switches for each phase are turned on for a portion of a cycle of a fundamental frequency of the AC voltage source and the portion includes less than a full cycle of the fundamental frequency. In one embodiment, the system includes a source phase module that determines a phase of the AC voltage source, a back-EMF phase module that determines a phase of a back-EMF of the motor, and a torque module that determines when a phase difference between the phase of the AC voltage source and the phase of the back-EMF is within a phase range indicative of a positive motor torque. The system, in one embodiment, includes a pulse module that enables turning on of the switch for each phase of the motor in response to the phase difference including a phase within the phase range and disables turning on of the switch for each phase of the motor in response to the phase difference including a phase not in the phase range. In another embodiment, the system includes a motor control center ("MCC") housing the motor starter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
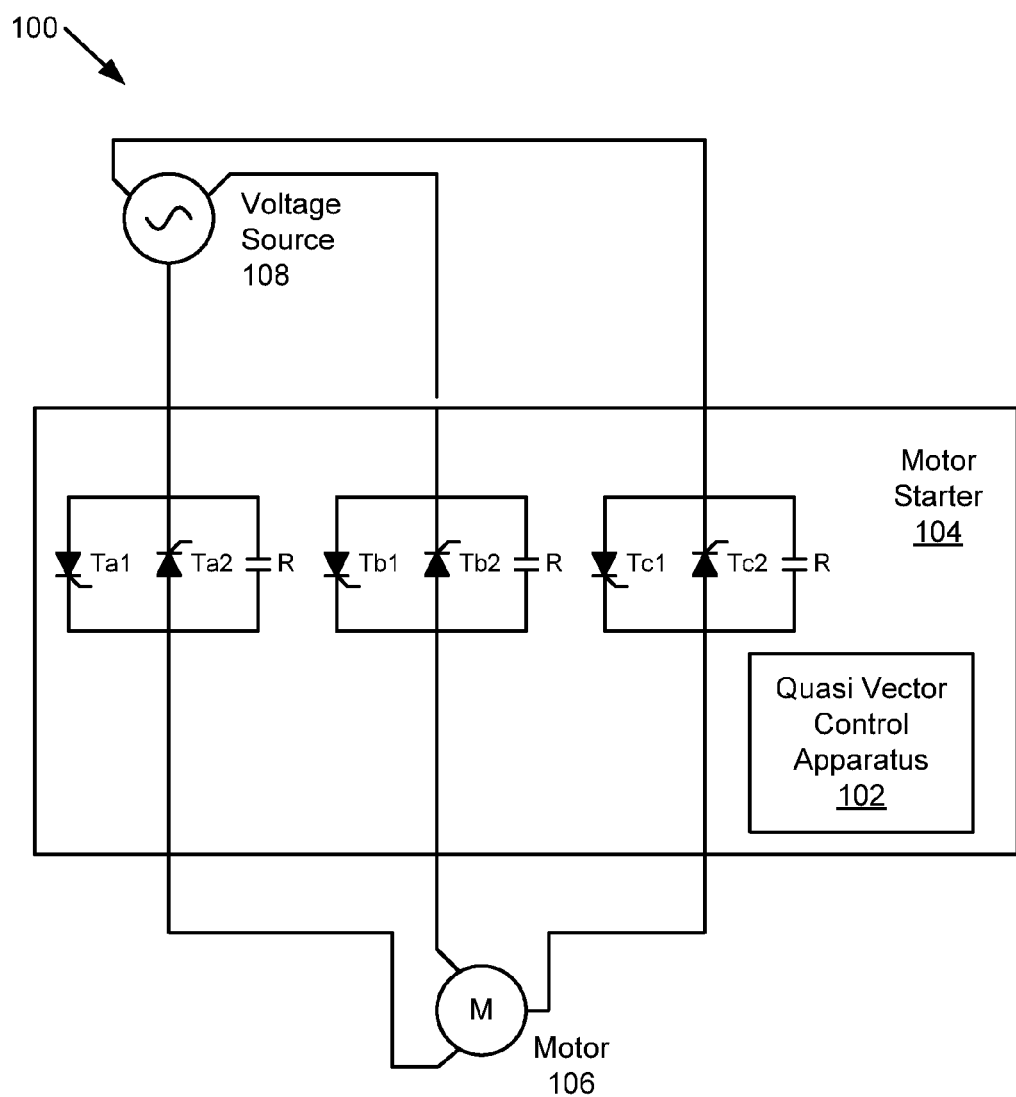
FIG. 1 is a schematic block diagram illustrating one embodiment of a system for a quasi vector motor controller.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory ("RAM"), a read-only memory ("ROM"), an erasable programmable read-only memory ("EPROM" or Flash memory), a portable compact disc read-only memory ("CD-ROM"), a digital versatile disc ("DVD"), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency ("RF"), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). The computer program product may be shared, simultaneously serving multiple customers in a flexible, automated fashion.

The computer program product may be integrated into a client, server and network environment by providing for the computer program product to coexist with applications, operating systems and network operating systems software and then installing the computer program product on the clients and servers in the environment where the computer program product will function. In one embodiment software is identified on the clients and servers including the network operating system where the computer program product will be deployed that are required by the computer program product or that work in conjunction with the computer program product. This includes the network operating system that is software that enhances a basic operating system by adding networking features.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

FIG. 1 is a schematic block diagram illustrating one embodiment of a system 100 for a quasi vector motor controller. The system 100 includes a quasi vector control apparatus 102 in a motor starter 104 that includes thyristors Ta1, Ta2, Tb1, Tb2, Tc1, Tc2 (collectively "T") and contactors R, a motor 106 and a voltage source 108, which are described below.

The system 100 includes a quasi vector control apparatus 102 in the motor starter 104. The quasi vector control apparatus 102 generates frequencies lower than a fundamental frequency of the voltage source 108 and also minimizes negative torque pulses during a motor startup operation. The quasi vector control apparatus 102 is discussed in more detail with regard to the apparatuses 200, 400, 500 of FIGS. 2, 4 and 5.

In one embodiment, the system 100 includes a motor starter 104 connected between a voltage source 108 and a motor 106. In one embodiment, the motor starter 104 includes thyristors T for each phase of the voltage source 108. A thyristor, also known as a silicon controlled rectifier ("SCR"), is a solid state device that blocks current through an anode and a cathode until voltage is applied between a gate and the cathode. Typically, when the voltage is applied between the gate and cathode, a thyristor conducts until voltage from the anode to cathode is negative and the thyristor is reverse biased. In one embodiment, the motor starter 104 includes back-to-back thyristors (e.g. Ta1, Ta2) to accommodate negative voltages for alternating current ("AC") waveforms. The motor starter 104 includes back-to-back thyristors (e.g. Ta1, Ta2 and Tb1 Tb2 and Tc1, Tc2) for each phase of the voltage source 108. In one embodiment, the motor starter 104 is a motor controller and may be used for motor starting and for controlling speed of the motor 106 during normal operation.

In one embodiment, the thyristors T are used for motor starting and the motor starter 104 includes a contactor R in parallel with each pair of thyristors (e.g. Ta1, Ta2). The contactors R, in one example, are closed with a single coil. In another example, each contactor R is controlled separately with separate coils. In one embodiment, when startup for the motor 106 is complete, the contactors R are closed to apply full voltage to the motor 106. In another embodiment, the motor starter 104 does not include contactors R and the thyristors T operate after startup. For example, the thyristors T may be used to control motor speed during operation after startup. In various embodiments, the motor starter 104 includes other types of switches, such as a TRIAC (triode for alternating current), an insulated-gate bipolar transistor ("IGBT"), a field effect transistor ("FET"), etc. Typically the switches are capable of operating during a portion of a cycle of the fundamental frequency of the voltage source 108 to connect the voltage source 108 to the motor 106 during a portion of a cycle.

The motor starter 104 may also include other components and systems typical of a motor starter 104, such as relays, contactors, sensors, overcurrent protection such as fuses, motor overloads, a communications bus, controls, a processor, memory, etc. The motor starter 104 may be a stand-alone enclosure or may be in a motor control center ("MCC") or other enclosure. The motor starter 104 may be rated for a single motor 106 or may be rated to control multiple motors. One of skill in the art will recognize other components and systems that may be included in the motor starter 104.

The system 100 includes a motor 106 connected to the motor starter 104. The motor 106, in one embodiment, is a three-phase motor that receives AC power. For example, the motor 106 may be a three-phase AC squirrel-cage motor. In another example, the motor 106 is a three-phase AC synchronous motor. In another embodiment, the motor 106 receives power from a voltage source 108 with a different number of phases. For example, the motor 106 may be a single-phase motor and the voltage source 108 may be a single-phase voltage source. For example, where the motor 106 is single phase, the motor 106 may include a separate starting winding, such as shaded pole winding, a winding connected with a centrifugal switch, etc. The motor 106 may be any motor that is capable of being controlled by altering on time of switches feeding the motor 106.

The system 100, in one embodiment, includes a voltage source 108 that provides power to the motor 106 through the motor starter 104, and may also be called an input power source. In one embodiment, the voltage source 108 is derived from an electric utility and may include a portion of a power distribution system with electrical panels, switchgear, circuit breakers, fuses, etc. In another embodiment, the voltage source 108 includes a generator, an inverter, or other power source capable of providing AC power to the motor 106. In the embodiment, depicted in FIG. 1, the voltage source 108 is a three-phase AC source. In another embodiment, the voltage source 108 is a direct current ("DC") source, such as a battery, and the system includes an inverter to invert the DC voltage from the DC source to an AC voltage for providing power to the motor 106. In other embodiments, the voltage source 108 may be a fuel cell, a wind turbine or other alternate energy source. One of skill in the art will recognize other ways to implement the voltage source 108.

Figure 2:
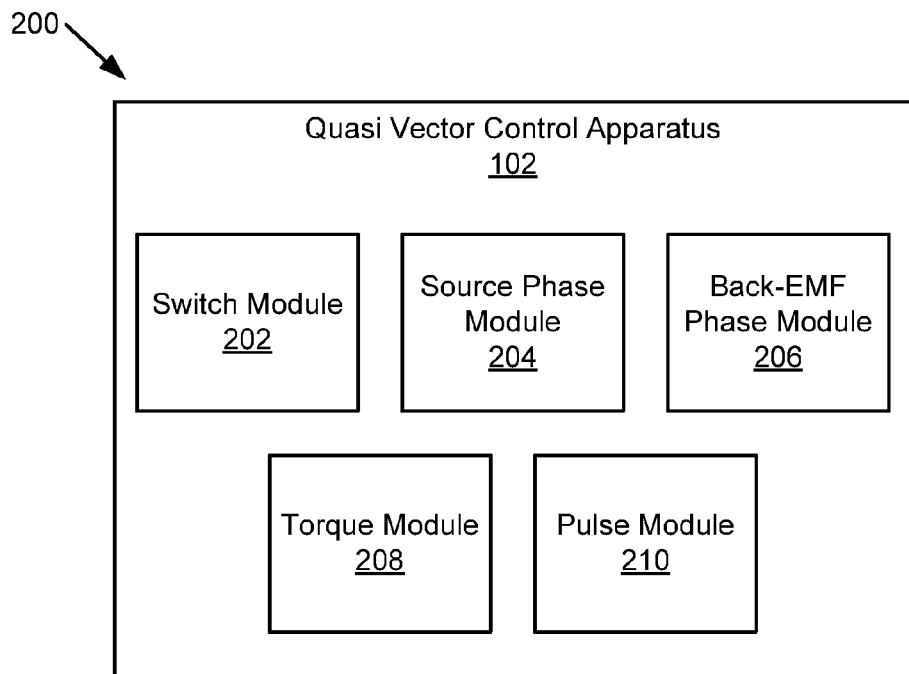
FIG. 2 is a schematic block diagram illustrating one embodiment of an apparatus for a quasi vector motor controller.

FIG. 2 is a schematic block diagram illustrating one embodiment of an apparatus 200 for a quasi vector motor controller. The apparatus 200 includes one embodiment of the quasi vector control apparatus 102 with a switch module 202, a source phase module 204, a back-EMF phase module 206, a torque module 208, and a pulse module 210, which are described below.

The apparatus 200, in one embodiment, includes a switch module 202 that, for each phase, selectively turns on a switch to connect an input power conductor connected to the AC voltage source 108 to the motor 106 in a sequence. The switch for each phase is turned on for a portion of a cycle of a fundamental frequency of the AC voltage source 108 and the portion includes less than a full cycle of the fundamental frequency. In one embodiment, the fundamental frequency may be set by voltage source 108 requirements, such as by an electric utility, generator, etc. In various embodiments the fundamental frequency may be 50 hertz ("Hz"), 60 Hz, 400 Hz, etc.

In one example, each switch may delay closing until after a zero crossing so that each switch is connected for less than a half cycle, except as interrupted as described below in relation to the pulse module 210. In one embodiment, each switch is closed for a fixed portion of each cycle for a particular motor starting step. In another embodiment, each switch may be closed for a variable amount of time during each cycle. For example, the switches may be varied to create different current pulse sizes to generate a discrete frequency that is less than the fundamental frequency of the voltage source 108. The discrete frequency may be part of a discrete frequency control ("DFC") method.

Figure 3:
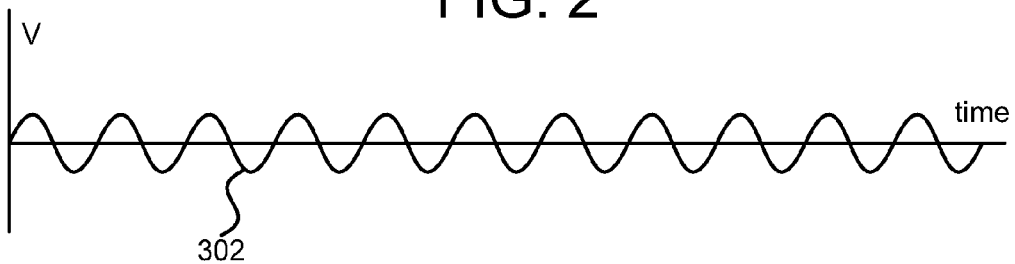
FIG. 3 is an illustration of waveforms for possible operation of a quasi vector motor controller using a discrete frequency control method.
Figure 3:
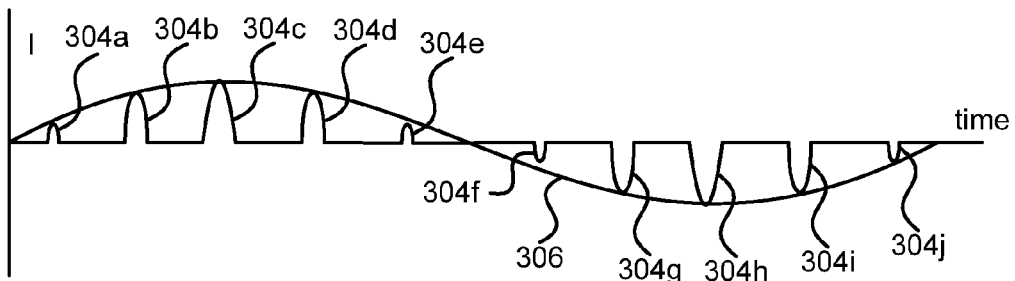

FIG. 3 is an illustration of waveforms for possible operation of a quasi vector motor controller using a DFC method. The upper waveform includes a sinusoidal voltage waveform 302 with voltage V on the vertical or Y-axis and time on the horizontal axis (X-axis). The voltage waveform 302 may be a 50 Hz or 60 Hz sinusoidal voltage waveform, for example, of the voltage source 108. In other embodiments, a different fundamental frequency may be used. The lower waveform includes time on the horizontal and current I on the vertical axis ("Y-axis").

The lower waveform includes several current pulses 304a-j of varying amplitudes and polarity. In the depicted waveform, a first pulse 304a is positive and small relative to other pulses (e.g. 304b-d). The second pulse 304b is larger than the first pulse 304a and the third pulse 304c is larger than the first and second pulses 304a, 304b. The fourth pulse 304d is smaller than the third pulse 304c and may have the same amplitude as the second pulse 304b. The fifth pulse 304e is smaller than the fourth pulse 304d and may have the same amplitude as the first pulse 304a. A series of negative pulses 304f-j follows the positive pulses 304a-e and may mirror the pattern of the positive pulses 304a-e, except that the negative pulses 304f-j have an amplitude that is negative.

Note that each pulse 304a-j occurs relative to zero crossing of the voltage waveform 302. Due to the size and polarity of the pulses 304a-j, a waveform is generated that has a fundamental frequency lower than the fundamental frequency of the voltage waveform 302. The lower fundamental frequency is depicted as waveform 306. One of skill in the art will recognize that a Fourier Transform of the waveform formed by the pulses 304a-j will include a fundamental frequency and harmonic frequencies. The amplitude, location, and polarity of the current pulses 304a-j are chosen so that a fundamental frequency 306 is generated as shown having a frequency lower than the frequency of the voltage waveform 302.

While the lower waveform in FIG. 3 includes five positive pulses 304a-e and five negative pulses 304f-j, other frequencies may also be generated by having more or less pulses per cycle and by adjusting amplitudes of the pulses. Note that a single voltage waveform 302 and corresponding current pulses 304a-j are shown in FIG. 3, but one of skill in the art will recognize that additional waveforms are included for three-phase systems. The DFC method may include phase shifting as appropriate so that if a fundamental waveform 306 of a lower frequency is generated, a second and a third corresponding lower frequency waveforms are also generated but phase shifted as appropriate for three-phase motor operation. For example, a second waveform may be phase shifted one-third of a cycle of the fundamental waveform 306 and a third waveform may be phase shifted two-thirds of a cycle of the fundamental waveform 306. For each discrete frequency of the DFC method, phase shifting of a second phase and a third phase are typically customized for the specific discrete frequency.

With the motor starter 104 as depicted in the system 100 of FIG. 1, one method of generating the pulses 304a-j is to trigger the appropriate thyristor (e.g. Ta1) at a specific time, for example where the switches of the switch module 202 includes thyristors T. If thyristor Ta1 is not triggered during a cycle, then the thyristor Ta1 will typically not conduct (other than leakage current). If thyristor Ta1 is triggered during a positive half cycle, typically current will start to flow to the motor 106. Current will usually continue to flow until the thyristor Ta1 is reversed biased. Note that current may continue to flow in the thyristor Ta1 for a period of time after being reverse biased due to inductance in the conductors and motor 106, but typically will eventually stop.

Based on voltage, motor impedance, parasitic resistance and inductance of the conductors, desired amplitude, etc., a trigger point within a cycle for a specific current pulse 304 may be chosen to generate a current pulse 304 of a specific amplitude. For example, a trigger point nearer to a zero crossing of the voltage waveform 302 will result in a pulse that is smaller than a pulse where the trigger point is earlier and farther from the zero crossing. For a negative current pulse, a thyristor (e.g. Ta2) may be chosen that is situated to conduct on a negative half cycle of the voltage waveform 302.

Where the apparatus 200 applies a discrete frequency that is less than the frequency of the fundamental of the voltage source 108, the motor 106 will have a rotating magnetic field applied to the stator of the motor 106 that will generate a mechanical force within the motor 106 to start turning the motor 106 in a particular direction, which causes a shaft connected to the rotor to generate a certain amount of torque. As the rotor of the motor 106 increases in speed, momentum of the motor may cause the rotor to increase in speed such than a negative torque pulse is generated. The negative torque pulse may have undesirable effects, such as decreased efficiency, increased heating, undesirable mechanical forces, noise, etc. In one embodiment, the motor 106 generates positive and negative torque pulses in an oscillating manner for at least a period of time, which is undesirable.

The switch module 202 may include thyristors T as discussed above, but in other embodiments may also include other types of switches, such as MOSFETs, IGBTs, etc. In another embodiment, the switch module 202 includes drivers, snubbers, control logic, a clock, a pulse-width modulator, etc. to open and close the switches. One of skill in the art will recognize other components that may be included in the switch module 202.

In one embodiment, the apparatus 200 includes a source phase module 204 that determines a phase of the AC voltage source 108 and a back-EMF phase module 206 that determines a phase of a back-electromotive force ("back-EMF") of the motor 106. The voltage source 108 includes voltage waveforms that are substantially sinusoidal. For a three-phase system voltage typically creates a rotating magnetic field and may be expressed as a rotating phasor with a phase that varies over time and rotates 360 degrees in one cycle. When three-phase voltage is applied to the motor 106, a changing magnetic field is generated in the stator of the motor 106 that affects the rotor of the motor 106 and induces current in the rotor and causes a back-EMF in the rotor. Again, the three-phase back-EMF of the rotor can be expressed as a phasor with a phase that varies over time.

In one embodiment, the source phase module 204 determines a phase of the voltage source 108 by measuring voltage of the voltage source 108 as it is applied to the motor 106. In one embodiment, the source phase module 204 samples voltage at a sampling rate that is substantially greater than the fundamental frequency of the voltage source 108 and the source phase module 204, in one embodiment, is capable of determining a phase of the voltage source 108 at a particular point in time.

The back-EMF phase module 206, in one embodiment, determines a phase of the back-EMF of the motor 106 using voltage and current measurements in the stator of the motor 106. In another embodiment, the back-EMF phase module 206 determines phase of the back-EMF by measuring the back-EMF of the rotor of the motor 106. For example, where the motor 106 is a permanent magnet synchronous motor, the back-EMF phase module 206 may calculate back-EMF from a motor encoder or resolver of the motor 106.

In one embodiment, the back-EMF phase module 206 measures voltage and current of the motor and estimates back-EMF of the motor 106 by transforming the three-phase voltages and currents to a stationary reference or two-phase coordinates using an Alpha-Beta transformation.

The alpha-beta transformation or 40 transformation, which may also be known as a Clarke transformation, is a method used in electrical engineering to simplify three-phase circuit calculations. The alpha-beta transformation is a way to change voltage and current in a three-phase coordinate system to a two-phase reference frame. If voltage phasors Va, Vb, and Vc are 120 degrees apart, Cartesian axes may be superimposed on the three-phased coordinate system where $V_\alpha$ is along the horizontal axis and $V_\beta$ is along the vertical axis. Three-phase voltages varying in time along the axes a, b, and c can be algebraically transformed into two-phase voltages varying in time along the α and β axes. The following is the alpha-beta transformation matrix:

$$T_{\alpha\beta 0} = \begin{bmatrix} \frac{2}{3} & -\frac{1}{3} & -\frac{1}{3} \\ 0 & \frac{1}{\sqrt{3}} & -\frac{1}{\sqrt{3}} \\ \frac{1}{3} & \frac{1}{3} & \frac{1}{3} \end{bmatrix} \quad \text{(equation 1)}$$

A set of three-phase, balanced voltages may be represented as $$\begin{bmatrix} V_a \\ V_b \\ V_c \end{bmatrix} = \begin{bmatrix} V_m \sin(\omega t) \\ V_m \sin\left(\omega t + \frac{2\pi}{3}\right) \\ V_m \sin\left(\omega t - \frac{2\pi}{3}\right) \end{bmatrix} \quad \text{(equation 2)}$$

in the three-phase coordinate system, where $V_m$ is a peak voltage, $\omega = 2\pi f$, and f is frequency in hertz. Applying the alpha-beta transformation to get two-phase voltages results in the following:

$$\begin{bmatrix} V_\alpha \\ V_\beta \\ V_0 \end{bmatrix} = T_{\alpha\beta 0} \begin{bmatrix} V_a \\ V_b \\ V_c \end{bmatrix} = \begin{bmatrix} V_m \sin(\omega t) \\ V_m \cos(\omega t) \\ 0 \end{bmatrix} \quad \text{(equation 3)}$$

Similarly, a set of balanced three-phase currents, which lag the voltage by an arbitrary angle δ, may be converted to two-phase currents:

$$\begin{bmatrix} I_a \\ I_b \\ I_c \end{bmatrix} = \begin{bmatrix} I_m \sin(\omega t - \delta) \\ I_m \sin\left(\omega t - \delta + \frac{2\pi}{3}\right) \\ I_m \sin\left(\omega t - \delta - \frac{2\pi}{3}\right) \end{bmatrix} \quad \text{(equation 4)}$$

where $I_m$ is a peak current, $\omega = 2\pi f$, and f is frequency in hertz. Applying the alpha-beta transformation to the get two-phase currents results in the following:

$$\begin{bmatrix} I_\alpha \\ I_\beta \\ I_0 \end{bmatrix} = T_{\alpha\beta 0} \begin{bmatrix} I_a \\ I_b \\ I_c \end{bmatrix} = \begin{bmatrix} I_m \sin(\omega t - \delta) \\ I_m \cos(\omega t - \delta) \\ 0 \end{bmatrix} \quad \text{(equation 5)}$$

In one embodiment, the back-EMF phase module 206 uses measured currents and voltages in an alpha-beta transformation to determine Vα, Vβ, Iα, Iβ and then determines the phase of the back-EMF of the motor 106 ($\theta_{emf}$) using equation 6:

$$\theta_{emf} = \tan^{-1}\left(\frac{\int (V_\beta - I_\beta R_s) dt}{\int (V_\alpha - I_\alpha R_s) dt}\right) + 90° \quad \text{(equation 6)}$$

Similarly, the source phase module 204 may use measured voltage of the voltage source 108 in an alpha-beta transformation to determine Vα and Vβ of the voltage source 108 and then may determine phase of the voltage source 108 ($\theta_{supply}$) using equation 7:

$$\theta_{supply} = \tan^{-1}\left(\frac{V_\beta}{V_\alpha}\right) \quad \text{(equation 7)}$$

In one embodiment, the apparatus 200 includes a torque module 208 that determines when a phase difference between the phase of the AC voltage source 108 and the phase of the back-EMF is within a phase range indicative of a positive motor torque.

For example, the torque module may calculate a difference between the phase of the voltage source 108 and the back-EMF by subtracting phase of the back-EMF from phase of the voltage source 108 ($\theta_{supply} - \theta_{emf}$). In one embodiment, the phase range is a set range. For example, the phase range may be about $\theta_{supply} - \theta_{emf} \geq 0°$ and $\theta_{supply} - \theta_{emf} \leq 30°$. In another embodiment, the phase range may be about $\theta_{supply} - \theta_{emf} \geq 0°$ and $\theta_{supply} - \theta_{emf} \leq 60°$, and all sub-ranges therebetween. Other ranges are possible. By stating that the range is "about" zero to 30 degrees or "about" zero to 60 degrees, one of skill in the art will recognize that a lower limit, for example, may be different than zero degrees by a small amount, for example −5° to 5°, and the upper limit may vary as well. In another embodiment, the phase range may differ based on various factors, such as motor type, motor size, motor load, motor speed, etc. In another embodiment, the phase range may be determined by experimentation. In another embodiment, the phase range may be determined by simulation.

In one embodiment, the phase range is set for when the motor 106 is expected to have negative torque and an upper limit and a lower limit of the phase range are set to when motor torque crosses from positive to negative or vice-versa. In another embodiment, the upper limit and/or lower limit of the phase range may be set for an expected negative torque at a particular value, such as a negative torque threshold. In another embodiment, the upper limit and/or lower limit of the phase range may be set for an expected positive torque before motor torque transitions negative. Typically phase angles where the upper and lower limits of the phase range are set affect current, motor H starting time, etc. and will be discussed further in relation to the pulse module 210.

In one embodiment, the apparatus 200 includes a pulse module 210 that enables turning on of the switch for each phase of the motor 106 in response to the phase difference including a phase within the phase range and disables turning on of the switch for each phase of the motor 106 in response to the phase difference comprising a phase not in the phase range. The phase difference, in one embodiment, is determined by the torque module 208. For example, if the phase range is set to $\theta_{supply} - \theta_{emf} \geq 0°$ and $\theta_{supply} - \theta_{emf} \leq 30°$ and the torque module 208 determines that the phase difference is 50 degrees or −20 degrees, the pulse module 210 may disable turning on switches of the switch module 202 for a next scheduled on time of one or more switches of the switch module 202.

In one embodiment, the torque module 208 continues to monitor phase difference over time and the pulse module 210 continues to disable turning on switches of the switch module 202 until the phase difference is in the phase range. While the phase difference determined by the torque module 208 is in the phase range, the pulse module 210 may then enable turning on switches of the switch module 202 until the phase difference transitions out of the phase range. By disabling switching while the phase difference is outside the phase range, the motor 106 may experience fewer negative torque pulses, which is beneficial. Reducing negative motor torque transitions to a negative value reduces motor current, mechanical stress, noise, etc. and may allow smaller switches to be used in the switch module 202.

Where the upper and lower limits of the phase range are set to allow some negative torque, the motor 106 may start quicker, but in some embodiments current may be higher. Where the upper and lower limits of the phase range are set conservatively to phase values where positive torque is expected prior to transitioning negative, the motor 106 may start slower, but in some embodiments current may be lower. One of skill in the art will recognize benefits and tradeoffs of various upper and lower limits for the phase range.

Figure 4:
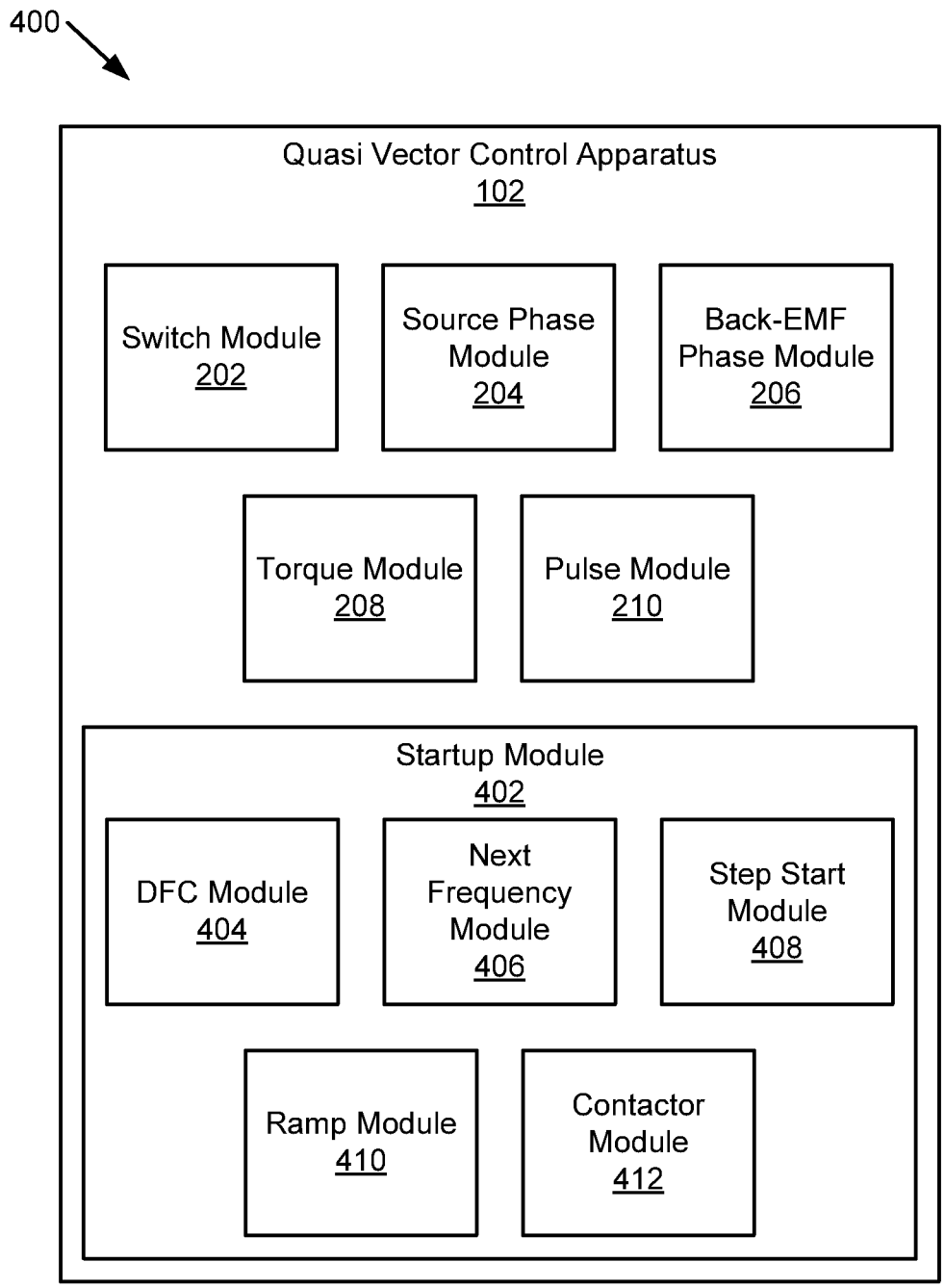
FIG. 4 is a schematic block diagram illustrating another embodiment of an apparatus for a quasi vector motor controller.

FIG. 4 is a schematic block diagram illustrating another embodiment of an apparatus 400 for a quasi vector motor controller. The apparatus 400, in one embodiment, one embodiment of the quasi vector control apparatus 102 with a switch module 202, a source phase module 204, a back-EMF phase module 206, a torque module 208, and a pulse module 210, which are substantially similar to those described above in relation to the apparatus 200 of FIG. 2. In various embodiments, the apparatus 400 may also include a startup module 402, which may include a DFC module 404, a next frequency module 406, a step start module 408, a ramp module 410, and/or a contactor module 412, which are described below.

In one embodiment, the apparatus 400 includes a startup module 402 that varies an on time of each switch of the switch module 202 to control motor startup. The on time for each switch includes a time when the switch is in a conductive state. The startup module 402, in one embodiment, operates for motor speeds less than a full speed and limits on time of the switches to an amount less than a full cycle and my reduce current in the motor 106 to a value less than a locked rotor current or maximum current of the motor 106. The startup module 402 may include some startup scheme, such as multiple starting steps to bring the motor 106 from a stopped state to a running state. In one embodiment, the startup module 402 brings the motor 106 to a full speed state where full voltage and a full cycle of the voltage source 108 is applied to the motor 106. One of skill in the art will recognize that motor speed in the full speed state may vary based on loading conditions.

In one embodiment, the startup module 402 includes a DFC module 404 that applies a series of discrete frequencies to the motor 106 as part of a DFC method for motor starting, for example, as described in relation to FIG. 3. Each discrete frequency includes a frequency lower than the fundamental frequency of the voltage source 108 providing power to the motor 106. For example, the DFC module 404 may apply discrete frequencies to the motor 106 when the motor 106 is stopped to bring the motor 106 to a particular speed or frequency. In one example, the DFC module 404 applies discrete frequencies up an upper limit of somewhere between about 25% and 50% of the fundamental frequency of the voltage source 108.

In another embodiment, the DFC module 404 applies discrete frequencies for speeds and frequencies above 50% of the fundamental frequency of the voltage source 108. Having a last frequency somewhere in the 25% to 50%, or a little higher, may be adequate. Having discrete frequencies closer to the fundamental frequency of the voltage source 108 may be less effective than at lower frequencies due to a lower number of cycles of the fundamental frequency of the voltage source 108 to control.

In one embodiment, the DFC module 404 works in conjunction with the source phase module 204, the back-EMF phase module 206, the torque module 208, and the pulse module 210 to apply discrete frequencies to the switch module 202 until a phase difference determined by the torque module 208 is outside the phase range so that the pulse module 210 disables turning on switches of the switch module 202. The pulse module 210 may disable switching in the switch module 202 so that one or more current pulses 304 are not applied to the motor 106. In one example, the DFC module 404 applies each discrete frequency to the motor 106 by controlling switching in the switch module 202.

In one embodiment, the DFC module 404 applies each discrete frequency to the motor 106 for a fixed period of time and when the pulse module 210 may disable switches for a portion of the fixed period for a particular discrete frequency. In another embodiment, the DFC module 404 applies each discrete frequency to the motor 106 until the phase difference determined by the torque module 208 is outside the phase range and then the DFC module 404 applies a next discrete frequency. Determining that the phase difference is outside the phase range, in one embodiment, is an indicator that the motor torque is below a negative torque threshold.

In another embodiment, the startup module 402 includes a next frequency module 406 that applies a next discrete frequency to the motor 106 in response to the torque module 208 determining that the motor torque has reached the negative torque threshold, which may include determining if the phase difference is not in the phase range or other indicator of negative torque. In one embodiment, the torque module 206 determines motor torque by calculating motor torque from input voltage and current information. The input voltage and current information are from conductors connected to the motor 106 to provide power to the motor 106. In one embodiment, motor torque can be determined using equation 1:

$$T_{est} = \frac{3}{2}P\left[I_\beta \cdot \int (V_\alpha - I_\alpha R_s)dt - I_\alpha \cdot \int (V_\beta - I_\beta R_s)dt\right] \quad \text{(equation 8)}$$

where:
$T_{est}$ is calculated motor torque;
P is the number of motor poles;
$R_s$ is resistance of stator winding;
$V_\alpha$, $V_\beta$ are stator voltage in a stationary reference frame; and
$I_\alpha$, $I_\beta$, are stator current in the stationary reference frame, where the voltage and current for each phase of the motor is transformed to the stationary reference frame using the alpha-beta transformation as described above. The next discrete frequency is a next frequency in the DFC method.

The next frequency module 406, in one embodiment, applies a next frequency to the motor 106 in response to the torque module 206 determining that the motor torque has reached the negative torque threshold. The next frequency includes a next frequency in the DFC method. For example, the DFC method may have a first frequency of 5 Hz and may have distinctive frequencies that increase by 2 Hz until reaching 25 Hz. (Note that for a 60 Hz system, an appropriate upper limit may be 30 Hz.) For instance, if the first frequency is 5 Hz, the second frequency may be 7 Hz, or where the first frequency is 7 Hz, the second frequency may be 9 Hz. Note that the example listed above is merely one set of discrete frequencies and other sets of discrete frequencies may be used during motor starting.

For example, the startup module 402 may apply a first frequency of 5 Hz to the motor 106 by generating current pulses as shown in FIG. 3. The motor 106 may then start rotating and eventually the torque module 206 may determine that motor torque generated by the motor 106 has reached the negative torque threshold. The next frequency module 406 may then apply a second frequency of 7 Hz to the motor 106. When the torque module 206 again determines that the motor torque generated by the motor 106 has reached the negative torque threshold, the next frequency module 406 may increase the frequency applied to the motor to 9 Hz. This process may continue until reaching a last frequency in the DFC method and the step start module 408 may then apply a one or more starting steps to the motor 106. Application of a next discrete frequency when the motor torque is below a next discrete frequency, other functionality of the torque module 208 (labeled 204) and the next frequency module 406 (labeled 206) are discussed in more detail in U.S. application Ser. No. _____, titled Quasi Variable Frequency Motor Controller, filed _____, 2014, for Kun Wei, et al. [hereinafter "QVFMC Application"], which is incorporated herein by reference for all purposes.

In one embodiment, the startup module 402 includes a step start module 408 that applies one or more starting steps where each starting step includes maintaining on time of the switches at a fixed value for a predetermined period of time. For example, where the switch module 202 includes thyristors T, the step start module 408 may set a fixed firing angle for each thyristor T for a period of time. In one embodiment, the step start module 408 includes one starting step. In another embodiment, the step start module 408 operates after the DFC module 404 reaches a last discrete frequency in the DFC method. In another embodiment, the step start module 408 includes multiple starting steps. In another embodiment, the step start module 408 operates after the DFC module 404 reaches a last discrete frequency in the DFC method and then the step start module 408 applies one or more starting steps to the motor 106.

In another embodiment, the startup module 402 includes a ramp module 410 that ramps on time of the switches using a ramp function. For example, where the switches in the switch module 202 are thyristors T, the ramp module 410 may ramp a firing angle from a low amount of on time to a high amount of on time for the thyristors T where the high on time may be a full cycle of the voltage source 108 or an amount of on time less than a full cycle. In another embodiment, the ramp module 410 works in conjunction with the DFC module 404 and/or the step start module 408. For example, the ramp module 410 may operate after the DFC module 404 reaches a last discrete frequency in the DFC method and then the ramp module 410 ramps on time of the switches. In another example, the ramp module 410 works in conjunction with the step start module 408 to ramp on time of the switches of the switch module 202 before and/or after a starting step. In another example, the DFC module 404 operates at low motor speed then the ramp module 410 and/or step start module 408 operate at higher motor speeds. One of skill in the art will recognize other ways to implement a DFC module 404, a step start module 408, and a ramp module 410 for motor starting.

The startup module 402, in one embodiment, includes a contactor module 412 that applies full input voltage to the motor 106 after a last step of the startup module 402. The contactor module 412 applies the full input voltage by closing a contactor in parallel with each switch. The contactor module 412, in one embodiment, applies the full input voltage by closing a contactor in parallel with each thyristor. For example, the contactor may include the contactor R shown in the system 100 of FIG. 1. Closing a contactor R in parallel with switches of the switch module 202 may be advantageous in some embodiments because the contactor R may have a lower resistance than the switches of the switch module 202, may require less control power, etc. and therefore may be more efficient.

In one embodiment, the apparatus 400 does not include the step start module 408 or ramp module 410 and the contactor module 412 closes the contacts R after the last discrete frequency of the DFC method. In another embodiment, the apparatus 400 includes the step start module 408 and/or ramp module 410 and the contactor module 412 closes the contacts R after a last step of the step start module 408 or at the end of a ramp function of the ramp module 410.

While the apparatus 400 of FIG. 4 includes a startup module 402 and describes various motor starting techniques that may be used with the quasi vector control apparatus 102, the quasi vector control apparatus 102 may also be used for controlling motor operations in other situations. For example, the quasi vector control apparatus 102 may be used to maintain a motor at a particular speed or may be used to vary motor speed within a range that includes motors speeds below a full speed of the motor. For example, the quasi vector control apparatus 102 may maintain set a firing angle for thyristors T so the motor 106 runs at a fixed speed and the quasi vector control apparatus 102 may disable the switches of the switch module 202 when the phase difference is outside the phase range. One of skill in the art will recognize other uses of the quasi vector control apparatus 102 for motor starting along with other motor control techniques.

Figure 5:
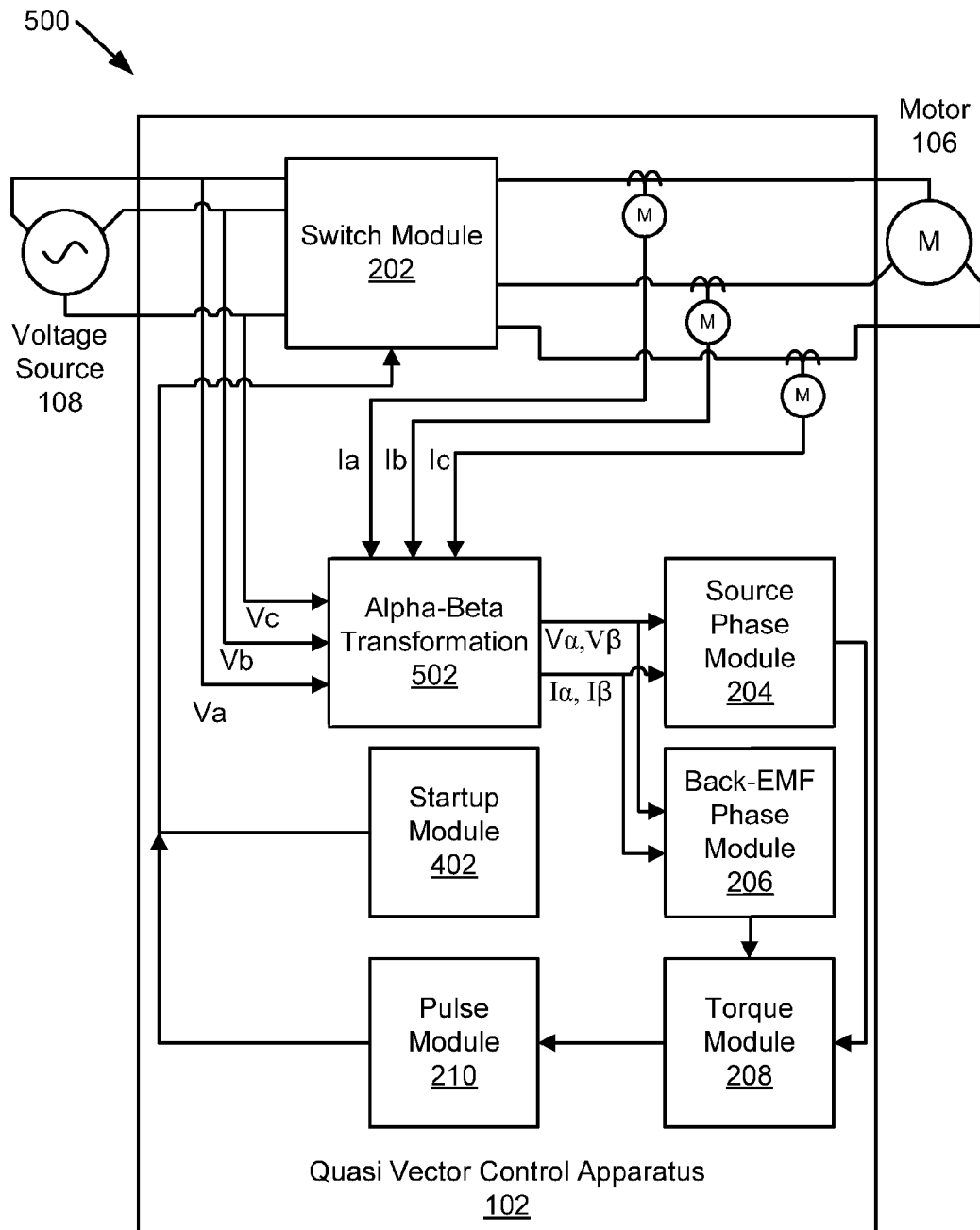
FIG. 5 is a schematic block diagram illustrating a third embodiment of an apparatus for a quasi vector motor controller.

FIG. 5 is a schematic block diagram illustrating a third embodiment of an apparatus 500 for a quasi vector motor controller. The apparatus 500 includes one embodiment of a quasi vector control apparatus 102 with a switch module 202, a source phase module 204, a back-EMF phase module 206, a torque module 208, a pulse module 210, and a startup module 402, which are substantially similar to those described above in relation to the apparatuses 200, 400 of FIGS. 2 and 4. In addition, the quasi vector control apparatus 102 includes an alpha-beta transformation 502. In another embodiment, the alpha-beta transformation 502 may be part of the source phase module 204 and/or the back-EMF phase module 206. The motor 106 and voltage source 108 are depicted in FIG. 5 as well.

In FIG. 5, measurements for phase voltages Va, Vb, and Vc are shown as well as measurements for phase currents to the motor Ia, Ib, and Ic. The phase voltages Va, Vb, Vc and phase currents Ia, Ib, Ic are shown feeding into the alpha-beta transformation 502. The alpha-beta transformation 502, in one embodiment, may be the same as in equations 1-5 described above. In one embodiment, the alpha-beta transformation 502 is implemented by digitizing the phase voltages Va, Vb, Vc and phase currents Ia, Ib, Ic and using a processor to implement equations 1-5. In another embodiment, discreet logic components are used to implement equations 1-5.

In one embodiment, the alpha-beta voltages and currents $V_\alpha, V_\beta, I_\alpha, I_\beta$ are fed to the source phase module 204 and the back-EMF phase module 206 and the results of the source phase module 204 and the back-EMF phase module 206 are fed to the torque module 208 to determine a phase difference. In one embodiment, the quasi vector control apparatus 102 includes a next frequency module 406 that coordinates with the torque module 208 and the torque module 208 calculates torque as described in equation 8 or predicts negative torque as described above by determining if the phase difference is outside the phase range and may apply a next discrete frequency when the torque module 208 determines that the torque is negative or that the phase difference is outside the phase range. The pulse module 210 may disable switches in the switch module 202 if the phase difference from the torque module 208 is outside the phase range. In one embodiment, the apparatus 500 of Figure is used to create a model for simulation. Simulation results from the model are shown in FIGS. 8-13.

Figure 6:
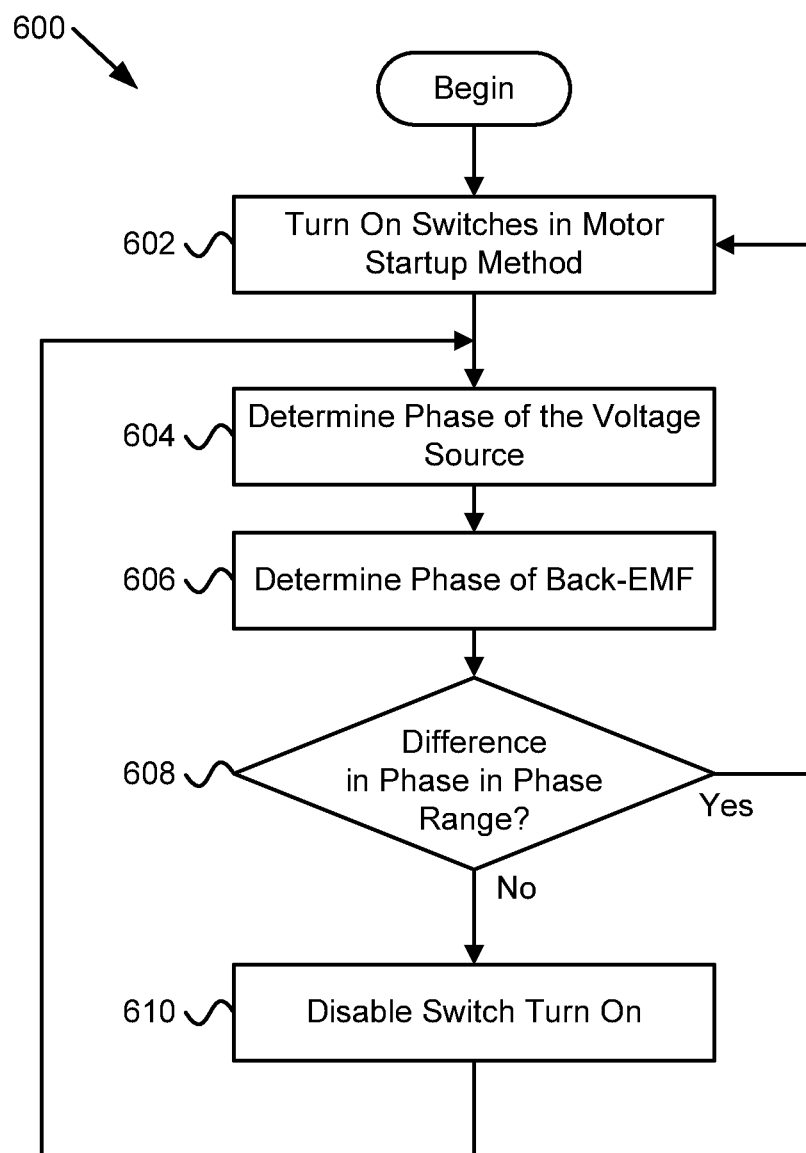
FIG. 6 is a schematic flow chart diagram illustrating one embodiment of a method for a quasi vector motor controller.

FIG. 6 is a schematic flow chart diagram illustrating one embodiment of a method 600 for a quasi vector motor controller. The method 600 begins and for each phase of the motor 106 selectively turns on 602 a switch to connect an input power conductor connected to the voltage source 108 to the motor 106 in a sequence. The switch for each phase is turned on 602 for a portion of a cycle of a fundamental frequency of the AC voltage source 108 where the portion is less than a full cycle of the fundamental frequency. In one embodiment, the switch module 202 selectively turns on 602 the switch for each phase.

The method 600 determines 604 a phase of the voltage source 108 and determines 606 a phase of the back-EMF. The method 600 determines 608 if a phase difference between the phase of the voltage source 108 and the phase of the back-EMF is in a phase range. The phase range is indicative of a motor torque that is positive. In some embodiments, the source phase module 204 may determine 604 the phase of the voltage source 108, the back-EMF phase module 206 may determine 606 the phase of the back-EMF, and the torque module 208 may determine 608 if the phase difference is outside the phase range.

If the method 600 determines 608 that the phase difference is in the phase range, the method 600 returns and turns on switches in the motor startup method. If the method 600 determines 608 that the phase difference is outside the phase range, the method 600 disables 610 turning on of the switches of the switch module 202 and the method 600 returns and determines 604 the phase of the voltage source 108. For example, the pulse module 210 may disable 610 turning on of the switches. The method 600 may continue the startup method and may disable 610 turning on of the switches of the switch module 202 each time that the phase difference is outside the phase range. Disabling turning of the switches of the switch module 202 when the phase difference is outside the phase range typically reduces motor current, reduces heat generation in the motor 106, reduces noise, reduces mechanical stress, etc.

Figure 7:
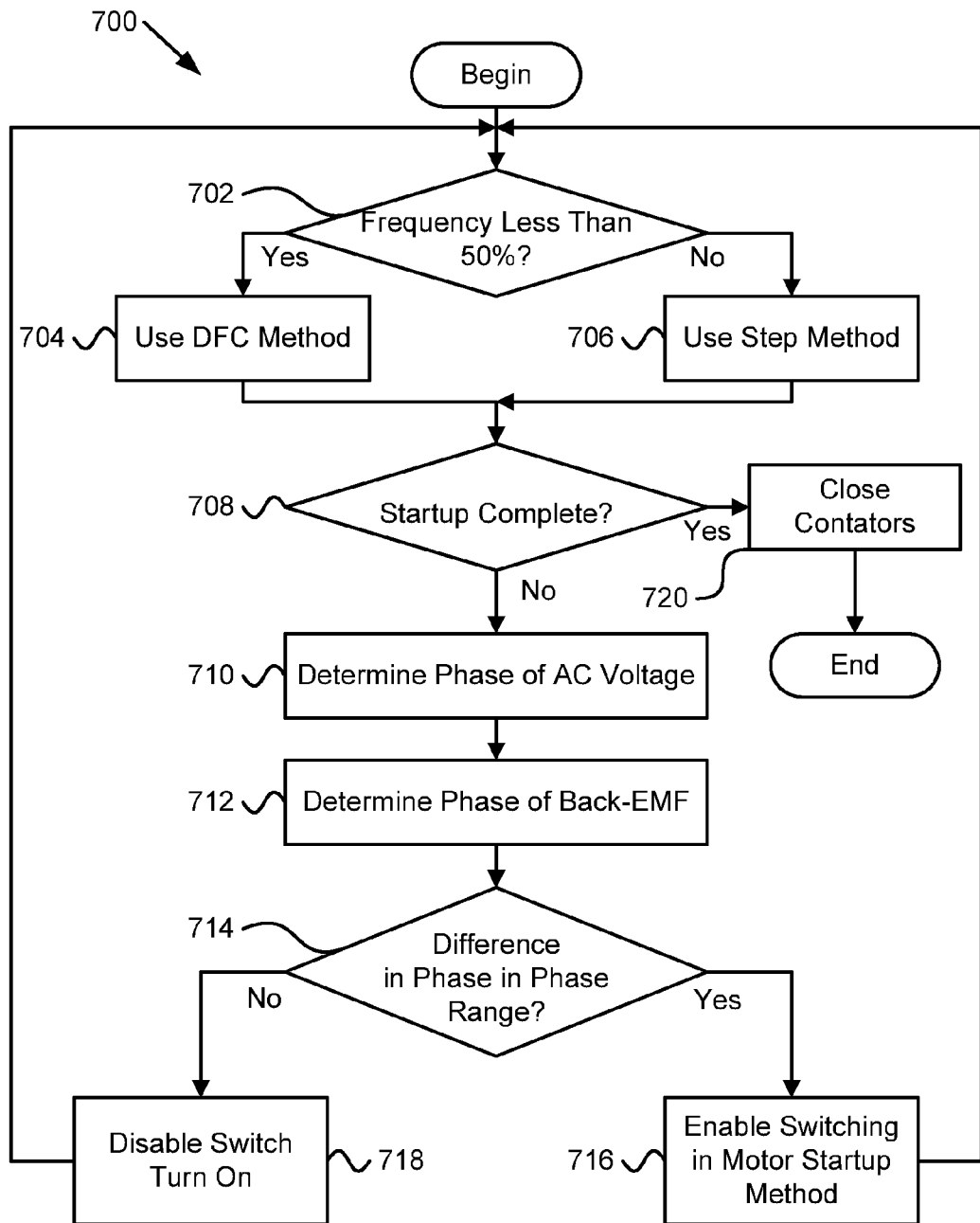
FIG. 7 is a schematic flow chart diagram illustrating another embodiment of a method for a quasi vector motor controller.

FIG. 7 is a schematic flow chart diagram illustrating another embodiment of a method 700 for a quasi vector motor controller. The method 700 is applicable to a situation where a motor starter 104 uses a DFC method for motor starting and then uses one or more starting steps when starting a motor 106. The method 700 begins and determines 702 if frequency of a waveform applied to the motor 106 in a motor startup method is less than 50% of the fundamental frequency of the voltage source 108. If the method 700 determines 702 that the frequency is less than 50%, the method 700 uses 704 a DFC method. For example, the motor starter 104 may include a startup module 402 that includes a DFC module 404 and possibly a next frequency module 406 and the method 700 may use the DFC module 404 and/or the next frequency module 406 to advance through a sequence of discrete frequencies.

If the method 700 determines 702 that the frequency of the motor starting method is above 50%, the method 700 uses 706 a step start method and applies a motor starting step to the motor 106. For example, the motor starter 104 may include a startup module 402 with a step start module 408 and may advance to a starting step after the DFC module 404 reaches a last discrete frequency. The step start module 408 may include one or more starting steps. The method 700 determines 708 if the startup is complete. If the method 700 determines 708 that the startup is not complete, the method 700 determines 710 a phase of the voltage source 108 and determines 712 a phase of the back-EMF. The method 700 determines 714 if a phase difference between the phase of the voltage source 108 and the phase of the back-EMF is in a phase range. The phase range is indicative of a motor torque that is positive. In some embodiments, the source phase module 204 may determine 710 the phase of the voltage source 108, the back-EMF phase module 206 may determine 712 the phase of the back-EMF, and the torque module 208 may determine 714 if the phase difference is outside the phase range.

If the method 700 determines 714 that the phase difference is in the phase range, the method 700 enables 716 turning on of switches in the motor startup method and the method 700 returns to determine 702 if the frequency is less than 50%. If the method 700 determines 714 that the phase difference is outside the phase range, the method 600 disables 718 turning on of the switches of the switch module 202 and the method 700 returns and determines 702 if the frequency of the starting method is less than 50%. For example, the pulse module 210 may disable 718 turning on of the switches. If the method 700 determines 708 that the startup is complete, the method 700 closes 720 contactors and ends. For example, the contactors may be the contactors R in the system 100 of FIG. 1.

Note that the embodiment depicted in FIG. 7 is merely one embodiment of a method 700 and a threshold different than 50% frequency or different motor starting methods may be used with the method 700. For example, another embodiment may use a DFC method with an upper frequency limit that is below 50%. In addition, the method 700 may use a ramp function instead of using 706 a step method. The quasi vector control apparatus 102 may be used with a variety of motor starting methods or may be used for maintaining the motor 106 at a particular speed.

Figure 8:
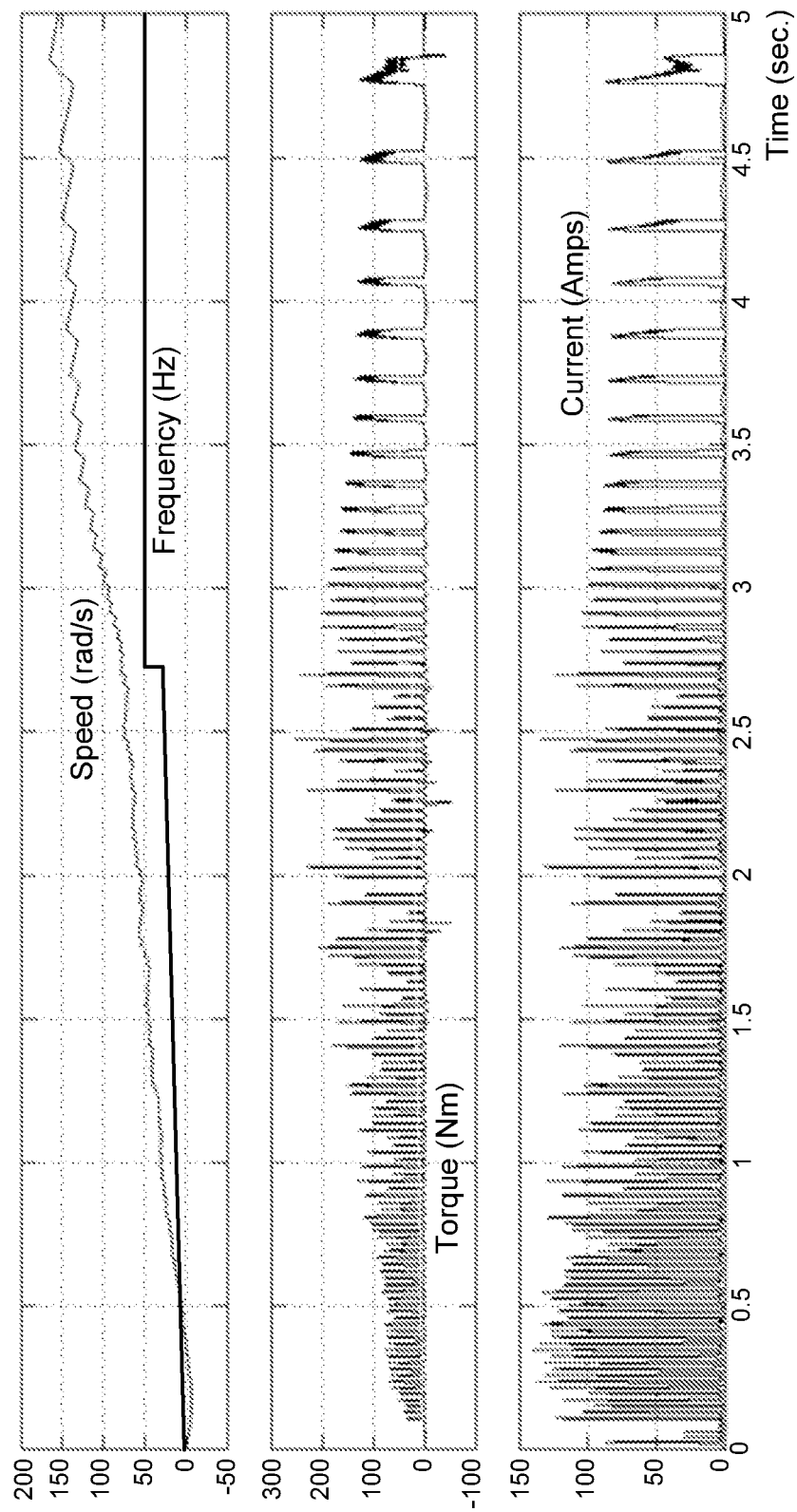
FIG. 8 depicts simulation results for a quasi vector motor controller for a 10 horsepower ("HP") motor.

FIG. 8 depicts simulation results for a quasi vector motor controller for a 10 horsepower ("HP") motor. Motor load is 25%. The top plot includes both speed in radians per second and frequency in hertz. The horizontal axis for all of the plots of FIG. 8 is time in seconds. The middle plot is torque of the motor 106 in newton-meters and the bottom plot is motor current in amperes. The fundamental frequency of the voltage source 108 is 50 Hz and the simulation is for a DFC method up to 25 Hz and then a 50 Hz voltage is applied to the motor 106, for example, simulating closing of contactors R. For the DFC method, discrete frequencies in 1 Hz increments are used to 25 Hz. The simulation uses a switch module 202 with thyristors T. Across all frequencies, thyristors T have firing angles set and triggers enabled when the phase difference is in the phase range of $\theta_{supply} - \theta_{emf} \geq 0°$ and $\theta_{supply} - \theta_{emf} \leq 30°$. When the phase difference is outside of this phase range the thyristors T are disabled and triggers are blocked.

Note that the torque pulses in the middle plot have minimal negative torque pulses. Note also that above about 25 Hz that speed is less smooth than below 25 Hz and torque pulses are more sporadic. The bottom plot of motor current reveals that the current is pulsed so the average motor current is lower than when current is constant and also lower than typical starting methods. Lower motor current typically results in lower thyristor junction temperature, which may allow selection of smaller thyristors than other thyristor-based motor starters.

Figure 9:
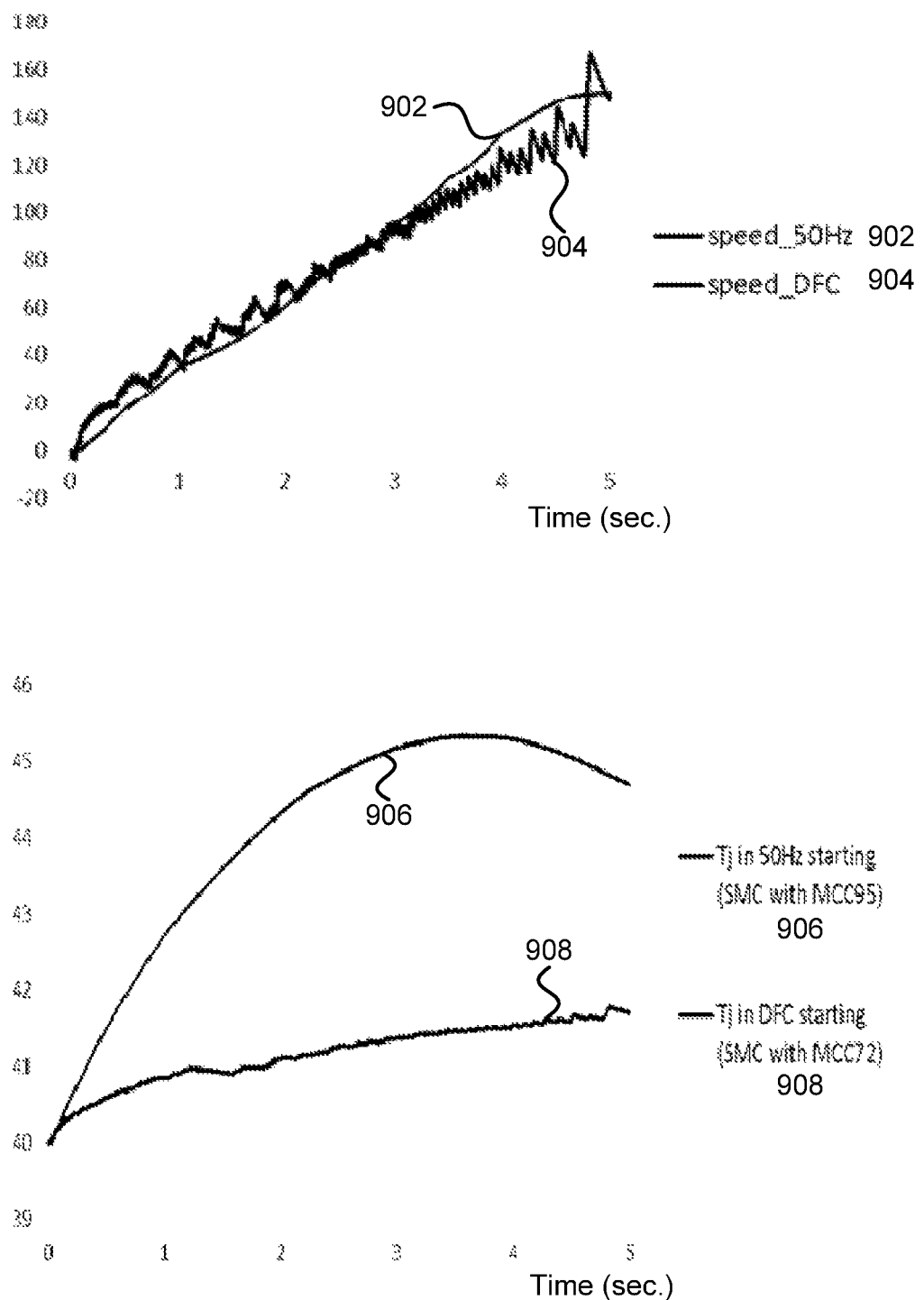
FIG. 9 depicts simulation results for a 10 HP motor at 50% load for a conventional soft starting method and for motor starting using a quasi vector motor controller.

FIG. 9 depicts simulation results for a 10 HP motor at 50% load for a conventional soft starting method and for motor starting using a quasi vector motor controller. One embodiment of the quasi vector motor controller may be the quasi vector control apparatus 102 as described herein. The upper plot is motor speed where the horizontal axis is time in seconds and the vertical axis is speed in radians per second. Speed for the conventional soft starter is labeled 902 and speed for the quasi vector motor controller is labeled 904. The lower plot includes junction temperature $T_j$ for the conventional soft starter labeled 906 and junction temperature $T_j$ for the quasi vector motor controller which is labeled 908. The horizontal axis is time in seconds and the vertical axis is junction temperature $T_j$ in degrees Celsius. The simulations emulate an Allen-Bradley® SMC starter where the conventional soft starter uses an MCC 95 dual thyristor module and the quasi vector motor controller uses an MCC 72 dual thyristor module.

Note that the speed for the conventional motor controller 902 is smoother than the speed for the quasi vector motor controller 904 but the junction temperature $T_j$ for the conventional soft starter 906 is much higher than the junction temperature $T_j$ for the quasi vector motor controller 908. The lower junction temperature $T_j$ for the quasi vector motor controller may allow a smaller thyristor to be used for a quasi vector control apparatus 102, which may save money and may be smaller.

Figure 10:
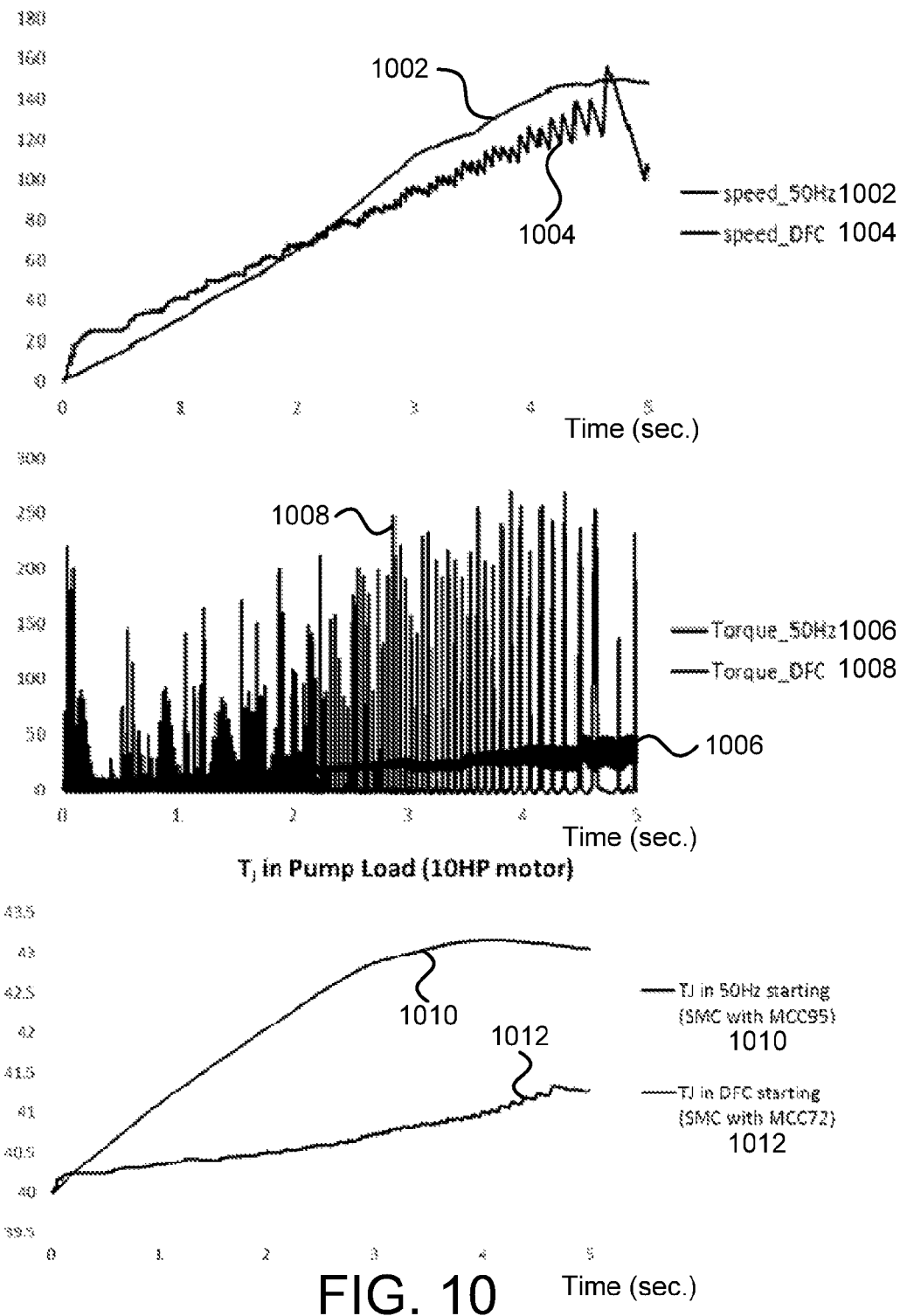
FIG. 10 depicts simulation results for a 10 HP motor for a pump load and for a conventional soft starting method and for motor starting using a quasi vector motor controller.

FIG. 10 depicts simulation results for a 10 HP motor for a pump load and for a conventional soft starting method and for motor starting using a quasi vector motor controller. The upper plot is motor speed where the horizontal axis is time in seconds and the vertical axis is speed in radians per second. Speed for the conventional soft starter is labeled 1002 and speed for the quasi vector motor controller is labeled 1004. The middle plot is torque in newton-meters where torque for the conventional soft starter is labeled 1006 and torque for the quasi vector motor controller is labeled 1008. The horizontal axis is time in seconds and the vertical axis is torque in newton-meters.

The lower plot includes junction temperature $T_j$ for the conventional soft starter labeled 1010 and junction temperature $T_j$ for the quasi vector motor controller which is labeled 1012. The horizontal axis is time in seconds and the vertical axis is junction temperature $T_j$ in degrees Celsius. The simulations emulate an Allen-Bradley® SMC starter where the conventional soft starter uses an MCC 95 dual thyristor module and the quasi vector motor controller uses an MCC 72 dual thyristor module.

Again the speed plot for the conventional soft starter 1002 is smoother than the speed plot for the quasi vector motor controller 1004. The middle plot reveals that the torque for the conventional soft starter 1006 is smoother than the torque plot for the quasi vector motor controller 1008, but the discrete torque pulses of the quasi vector motor controller 1008 result in a lower junction temperature $T_j$, as can be seen in the lower plot where junction temperature $T_j$ for the quasi vector motor controller 1012 is much lower than junction temperature $T_j$ for the conventional soft starter 1010.

Figure 11:
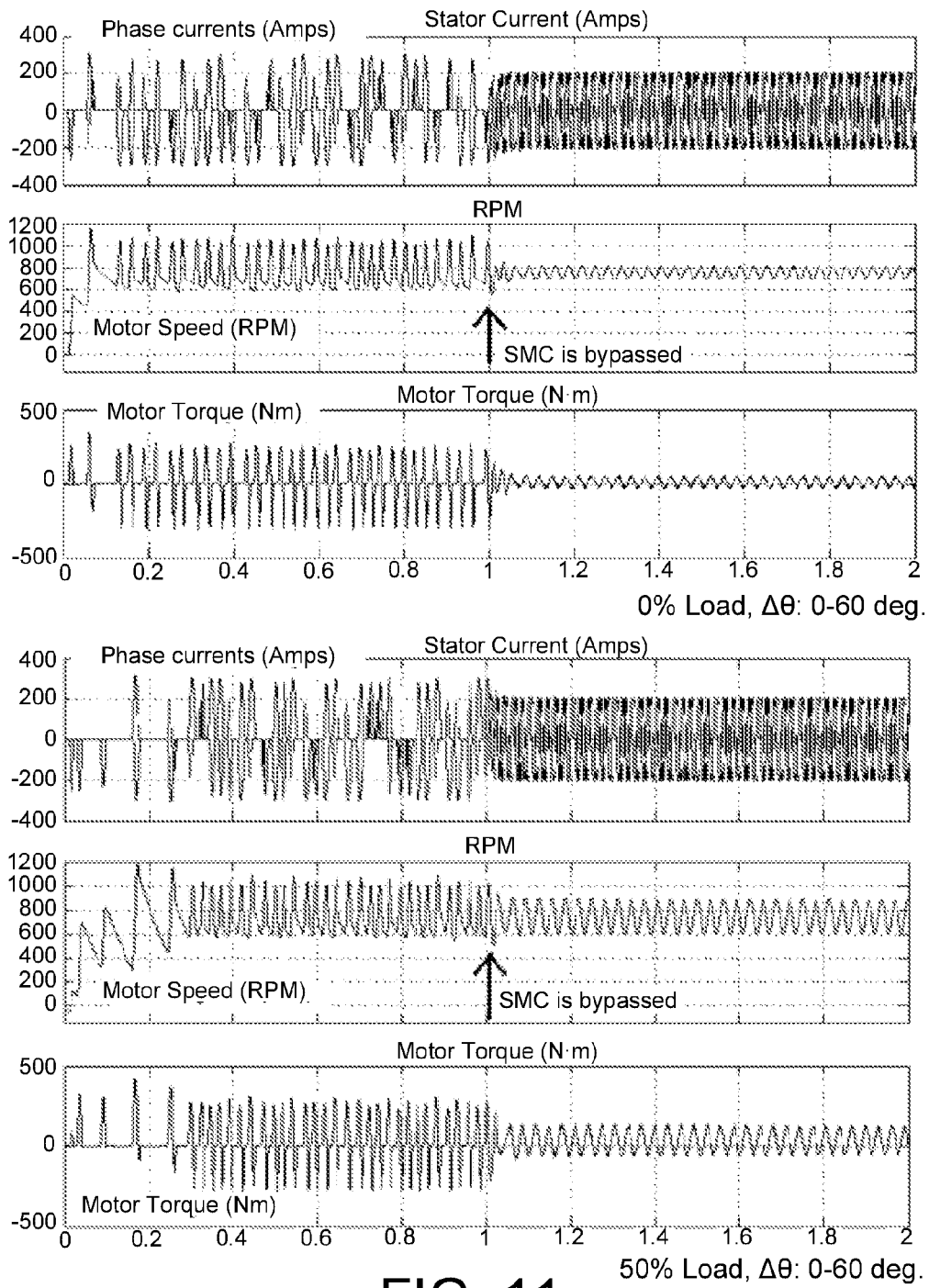
FIG. 11 depicts simulation results for a permanent magnet synchronous motor ("PMSM") with an inertia ratio of 10 at 0% load and 50% load for a quasi vector motor controller with a phase angle difference range of zero to 60 degrees.

FIG. 11 depicts simulation results for a permanent magnet synchronous motor ("PMSM") with an inertia ratio of 10 at 0% load and 50% load for a quasi vector motor controller with a phase angle difference range of zero to 60 degrees. The horizontal axis for all plots is time in minutes. The upper half of FIG. 11 is for 0% load and includes three plots. The upper plot for 0% load is for phase current in the stator in amperes. The phase currents are superimposed. The vertical axis is amperes. The middle plot for 0% load is motor speed in revolutions per minute ("RPM") and the lower plot for 0% load is motor torque in newton-meters. The bottom plot for 50% load has the same plots of current, motor speed, and motor torque. At 1 minute the thyristors T are bypassed with contactors R (labeled "SMC is bypassed").

Note that the phase currents are intermittent for startup before the thyristors are bypassed. The motor speed increases to around 800 RPM but is more varied than after the thyristors are bypassed. The motor torque displays quite a bit of negative torque pulses.

Figure 12:
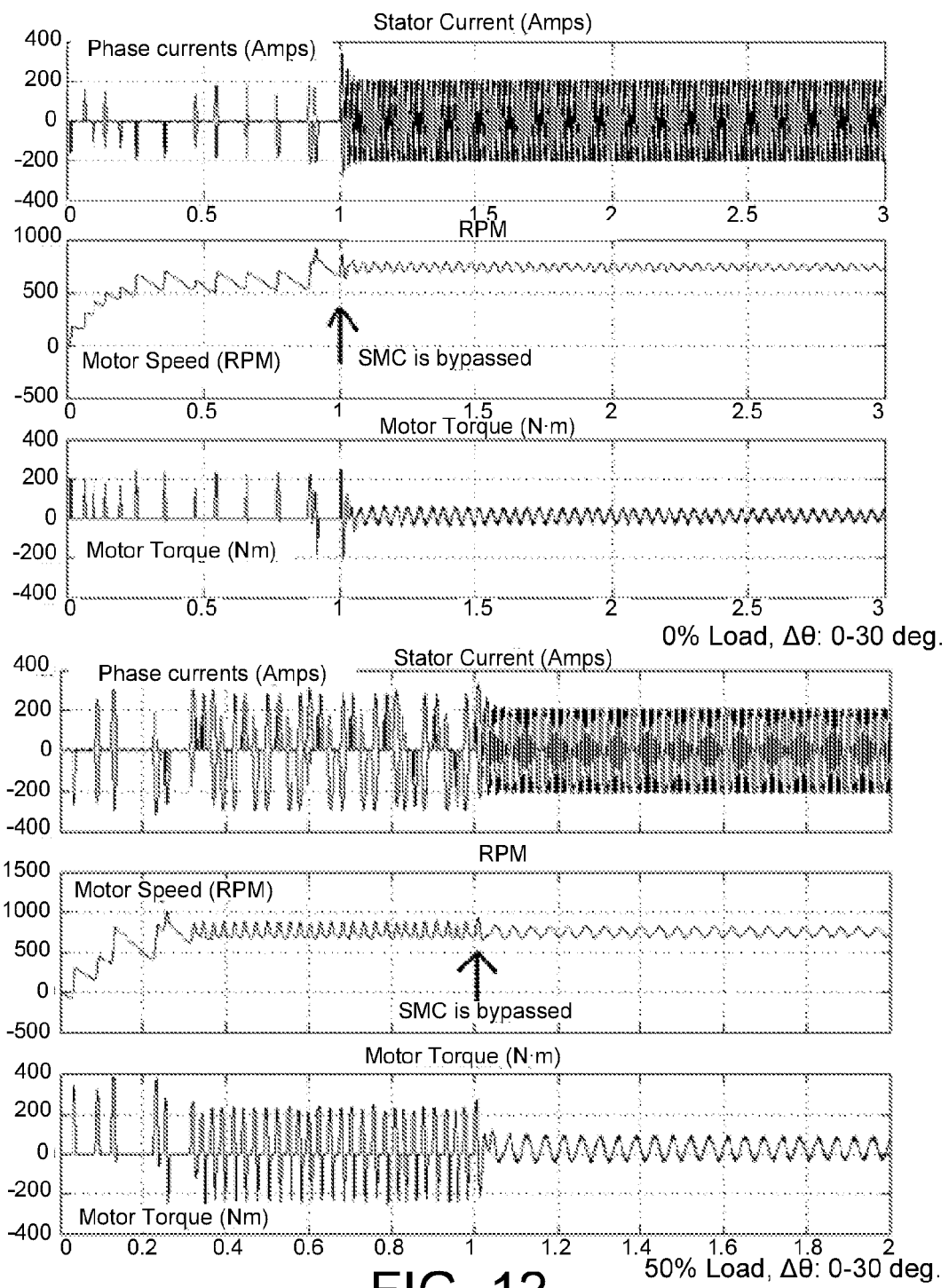
FIG. 12 depicts simulation results for a PMSM with an inertia ratio of 20 at 0% load and 50% load for a quasi vector motor controller with a phase angle difference range of zero to 30 degrees.

FIG. 12 depicts simulation results for a PMSM with an inertia ratio of 20 at 0% load and 50% load for a quasi vector motor controller with a phase angle difference range of zero to 30 degrees. The horizontal axis for all plots is time in minutes. The upper half of FIG. 12 is for 0% load and includes three plots. The upper plot for 0% load is for phase current in the stator in amperes. The phase currents are superimposed. The vertical axis is amperes. The middle plot for 0% load is motor speed in RPM and the lower plot for 0% load is motor torque in newton-meters. The bottom plot for 50% load has the same plots of current, motor speed, and motor torque. At 1 minute the thyristors are bypassed with contactors R (labeled "SMC is bypassed").

Note that the phase currents are intermittent for startup before the thyristors T are bypassed. Again the motor speed increases to around 800 RPM and is more varied than after the thyristors T are bypassed. Note also that the motor torque displays less negative torque pulses for 0% load and less negative motor torque pulses for 50% load than the simulation of FIG. 11.

Figure 13:
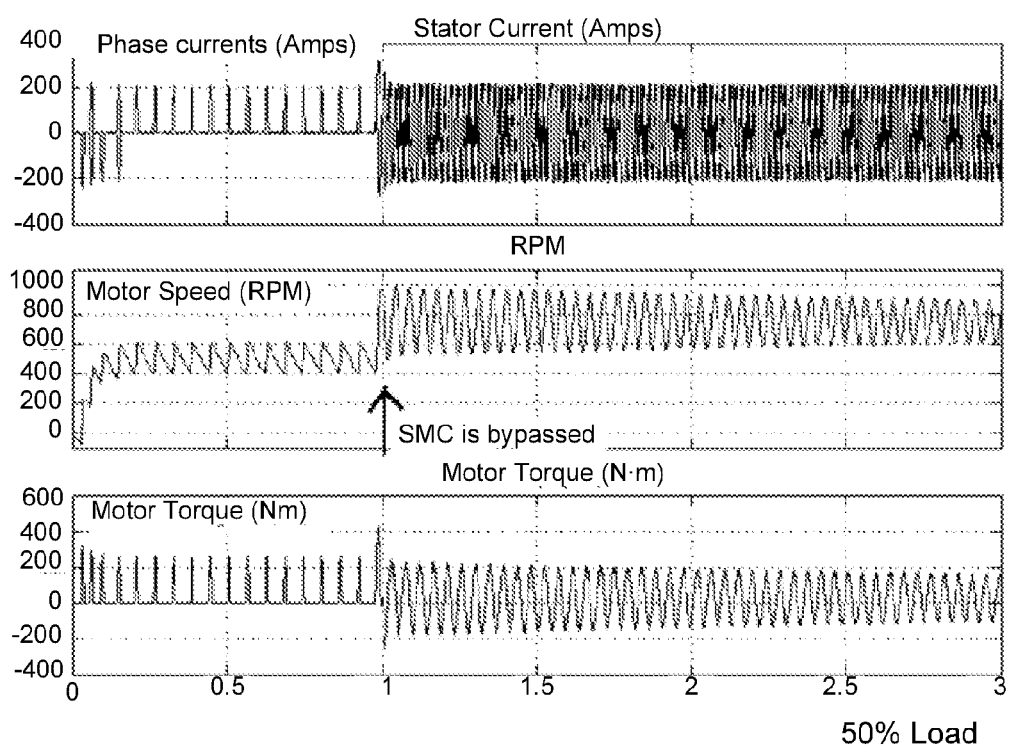
FIG. 13 depicts simulation results for a PMSM with an inertia ratio of 20 at 50% load for a quasi vector motor controller for a fixed speed of 500 RPM and for when the motor starter is bypassed.

FIG. 13 depicts simulation results for a PMSM with an inertia ratio of 20 at 50% load for a quasi vector motor controller for a fixed speed of 500 RPM and for when the motor starter is bypassed. The horizontal axis for all plots is time in minutes. The upper plot is for phase current in the stator in amperes. The phase currents are superimposed. The vertical axis is amperes. The middle plot is motor speed in RPM and the lower plot is motor torque in newton-meters. At 1 minute the thyristors T are bypassed with contactors R (labeled "SMC is bypassed").

Again the phase currents are intermittent, which reduces motor current. The motor speed plot shows that the motor speed until the thyristors are bypassed is set to about 500 RPM. The motor speed is set by setting an appropriate firing angle for the thyristors T. The bottom plot reveals that the quasi vector motor controller eliminates negative torque pulses. The simulations of FIGS. 11-13 demonstrate that embodiments of the quasi vector control apparatus 102, including the quasi vector motor controller used in the simulations, can be used for starting a permanent magnet synchronous motor, in addition to an AC squirrel cage induction motor.

In one embodiment, for permanent magnet synchronous motors the quasi vector control apparatus 102 continues to operate after startup. For example, the quasi vector control apparatus 102 may not close contractors R after startup or a system with the quasi vector control apparatus 102 with a PMSM may not include contractors R. Having the quasi vector control apparatus 102 remain active after startup, in one embodiment, may reduce negative torque pulses after startup, for example, for a load change. When a load change occurs, negative torque pulses may occur and may be prevented or reduced using the quasi vector control apparatus 102. Embodiments of the quasi vector control apparatus 102 may also be used for other motors where switches are used to connect a voltage source 108 to a motor 106 and where on time of the switches may be varied for motor control and starting.

The described examples and embodiments are to be considered in all respects only as illustrative and not restrictive. This written description uses examples and embodiments to disclose the invention, including best mode, and also to enable any person skilled in the art to practice the invention, including making and using any devices or systems and performing any incorporated methods. The examples and embodiments may be practiced in other specific forms. The patentable scope of this invention is defined by the claims and may include other examples that occur to those skilled in the art. Such other examples are intended to be within the claims if they have structural elements that do not differ from the literal language of the claims, or if they include equivalent structural element with insubstantial differences from the literal languages of the claims.

What is claimed is:

1. An apparatus comprising:
   a switch module that, for each phase, selectively turns on a switch to connect an input power conductor connected to an alternating current ("AC") voltage source to a motor in a sequence, wherein the switch for each phase is turned on for a portion of a cycle of a fundamental frequency of the AC voltage source, the portion comprising less than a full cycle of the fundamental frequency;
   a source phase module that determines a phase of the AC voltage source;
   a back-EMF phase module that determines a phase of a back-electromotive force ("back-EMF") of the motor;
   a torque module that determines when a phase difference between the phase of the AC voltage source and the phase of the back-EMF is within a phase range indicative of a positive motor torque; and
   a pulse module that enables turning on of the switch for each phase of the motor in response to the phase difference comprising a phase within the phase range and disables turning on of the switch for each phase of the motor in response to the phase difference comprising a phase not in the phase range,
   wherein at least a portion of the switch module, the source phase module, the back-EMF phase module, the torque module, and the pulse module comprise one or more of hardware and executable code, the executable code stored on one or more non-transitory computer readable storage media.

2. The apparatus of claim 1, wherein the phase range comprises phases where motor torque is expected to be positive.

3. The apparatus of claim 2, wherein the phase range comprises phases between about zero degrees and about 30 degrees.

4. The apparatus of claim 1, wherein the source phase module determines a phase of the AC voltage source using the following equation:

$$\theta_{supply} = \tan^{-1}\left(\frac{V_\beta}{V_\alpha}\right)$$

wherein
$\theta_{supply}$ is the phase of the voltage source; and
$V_\alpha, V_\beta$ are stator voltage in a stationary reference frame, wherein the voltage for each phase of the voltage source is transformed to the stationary reference frame using an alpha-beta transformation.

5. The apparatus of claim 1, wherein the back-EMF phase module determines a phase of back-EMF of the motor using voltage and current measurements in a stator of the motor.

6. The apparatus of claim 1, wherein the back-EMF phase module determines a phase of back-EMF of the motor using the following equation:

$$\theta_{emf} = \tan^{-1}\left(\frac{\int(V_\beta - I_\beta R_s)dt}{\int(V_\alpha - I_\alpha R_s)dt}\right) + 90°$$

wherein
$\theta_{emf}$ is the phase of the back-EMF of the motor; and
$R_s$ is resistance of stator winding;
$V_\alpha, V_\beta$ are stator voltage in a stationary reference frame; and
$I_\alpha, I_\beta$ are stator current in the stationary reference frame, where the voltage and current for each phase of the motor is transformed to the stationary reference frame using an alpha-beta transformation.

7. The apparatus of claim 1, wherein the switch module comprises one or more thyristors for each phase of the motor and wherein each thyristor is controlled by adjusting a phase angle for turning on each thyristor.

8. The apparatus of claim 1, further comprising a startup module that varies an on time of each switch to control motor startup, the on time for each switch comprising a time when the switch is in a conductive state.

9. The apparatus of claim 8, wherein the startup module comprises a DFC module that sequentially applies a series of discrete frequencies to the motor as part of a discrete frequency control ("DFC") method for motor starting, wherein each discrete frequency comprises a frequency lower than the fundamental frequency of the AC voltage source providing power to the motor.

10. The apparatus of claim 9, wherein the DFC module applies a discrete frequency by varying a phase angle for turning on a thyristor to generate positive current pulses of varying amplitudes for a positive half cycle of the discrete frequency and then varying a phase angle for turning on a thyristor to generate negative current pulses of varying amplitudes for a negative half cycle of the discrete frequency, wherein each current pulse is generated at a rate consistent with the fundamental frequency of the AC voltage source.

11. The apparatus of claim 8, wherein the startup module further comprises a step start module that applies one or more starting steps, wherein each starting step comprises maintaining on time of the switches at a fixed value for a predetermined period of time.

12. The apparatus of claim 8, wherein the startup module comprises a ramp module that ramps on time of the switches using a ramp function.

13. The apparatus of claim 8, further comprising a contactor module that applies full input voltage to the motor after a last step of the startup module, the contactor module applying the full input voltage by closing a contactor in parallel with each switch.

14. A method comprising:
for each phase of a motor, selectively turning on a switch to connect an input power conductor connected to an alternating current ("AC") voltage source to the motor in a sequence, wherein the switch for each phase is turned on for a portion of a cycle of a fundamental frequency of the AC voltage source, the portion comprising less than a full cycle of the fundamental frequency;
determining a phase of the AC voltage source;
determining a phase of a back-electromotive force ("back-EMF") of the motor;
determining when a phase difference between the phase of the AC voltage source and the phase of the back-EMF is within a phase range indicative of a positive motor torque; and
enabling turning on of the switch for each phase of the motor in response to the phase difference comprising a phase within the phase range and disabling turning on of the switch for each phase of the motor in response to the phase difference comprising a phase not in the phase range.

15. The method of claim 14, wherein determining a phase of the AC voltage source comprises using the following equation:

$$\theta_{supply} = \tan^{-1}\left(\frac{V_\beta}{V_\alpha}\right)$$

wherein
$\theta_{supply}$ is the phase of the voltage source; and
$V_\alpha$, $V_\beta$ are stator voltage in a stationary reference frame, wherein the voltage for each phase of the voltage source is transformed to the stationary reference frame using an alpha-beta transformation.

16. The method of claim 14, wherein determining a phase of back-EMF of the motor comprises using the following equation:

$$\theta_{emf} = \tan^{-1}\left(\frac{\int (V_\beta - I_\beta R_s)dt}{\int (V_\alpha - I_\alpha R_s)dt}\right) + 90°$$

wherein
$\theta_{emf}$ is the phase of the back-EMF of the motor; and
$R_s$ is resistance of stator winding;

$V_\alpha$, $V_\beta$ are stator voltage in a stationary reference frame; and
$I_\alpha$, $I_\beta$ are stator current in the stationary reference frame, where the voltage and current for each phase of the motor is transformed to the stationary reference frame using an alpha-beta transformation.

17. The method of claim 14, further comprising varying an on time of each switch to control motor startup, the on time for each switch comprising a time when the switch is in a conductive state.

18. The method of claim 17, wherein varying an on time of each switch to control motor startup comprises one or more of:
sequentially applying a series of discrete frequencies to a motor as part of a discrete frequency control ("DFC") method for motor starting, wherein each discrete frequency comprises a frequency lower than a fundamental frequency of the AC voltage source providing power to the motor;
applying one or more steps, wherein each step comprises maintaining on time of the switches at a fixed value for a predetermined period of time; and
ramping on time of the switches using a ramp function.

19. A system comprising:
a motor starter comprising
for each phase of a motor, one or more switches connecting a phase of an alternating current ("AC") voltage source to the motor; and
a switch module that, for each phase, selectively turns on the one or more switches to connect an input power conductor connected to the AC voltage source to the motor in a sequence, wherein the one or more switches for each phase are turned on for a portion of a cycle of a fundamental frequency of the AC voltage source, the portion comprising less than a full cycle of the fundamental frequency;
a source phase module that determines a phase of the AC voltage source;
a back-EMF phase module that determines a phase of a back-electromotive force ("back-EMF") of the motor;
a torque module that determines when a phase difference between the phase of the AC voltage source and the phase of the back-EMF is within a phase range indicative of a positive motor torque; and
a pulse module that enables turning on of the switch for each phase of the motor in response to the phase difference comprising a phase within the phase range and disables turning on of the switch for each phase of the motor in response to the phase difference comprising a phase not in the phase range.

20. The system of claim 19, further comprising a motor control center ("MCC") housing the motor starter.

* * * * *